(12) United States Patent
Bahramshahry et al.

(10) Patent No.: US 11,294,726 B2
(45) Date of Patent: Apr. 5, 2022

(54) SYSTEMS, METHODS, AND APPARATUSES FOR IMPLEMENTING A SCALABLE SCHEDULER WITH HETEROGENEOUS RESOURCE ALLOCATION OF LARGE COMPETING WORKLOADS TYPES USING QOS

(71) Applicant: salesforce.com, inc., San Francisco, CA (US)

(72) Inventors: Armin Bahramshahry, West Vancouver (CA); Piranavan Selvanandan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 124 days.

(21) Appl. No.: 15/587,170

(22) Filed: May 4, 2017

(65) Prior Publication Data
US 2018/0321971 A1   Nov. 8, 2018

(51) Int. Cl.
*G06F 9/50* (2006.01)
*G06F 9/48* (2006.01)

(52) U.S. Cl.
CPC .......... *G06F 9/5044* (2013.01); *G06F 9/4881* (2013.01)

(58) Field of Classification Search
None
See application file for complete search history.

(56) References Cited

U.S. PATENT DOCUMENTS 5,577,188 A   11/1996   Zhu
5,608,872 A   3/1997   Schwartz et al.
(Continued)

OTHER PUBLICATIONS

U.S. Appl. No. 16/774550.
(Continued)

*Primary Examiner* — Lewis A Bullock, Jr.
*Assistant Examiner* — Melissa A Headly
(74) *Attorney, Agent, or Firm* — Elliott, Ostrander & Preston, P.C.

(57) ABSTRACT

In accordance with disclosed embodiments, there are provided systems, methods, and apparatuses for implementing a scalable scheduler with heterogeneous resource allocation of large competing workloads types using Quality of Service (QoS) requirements. For instance, according to one embodiment, there is disclosed a system to implement a scheduling service, in which the system includes: a processor and a memory to execute instructions at the system; a local cache allocated within the memory of the system; a compute resource discovery engine to identify a plurality of computing resources available to execute workload tasks, the computing resources residing within any one of private or public datacenters or third party computing clouds and a plurality of resource characteristics for each of the plurality of computing resources identified; in which the compute resource discovery engine is to fill the local cache with information representing each of the identified computing resources available and the plurality of resource characteristics identified for each of the plurality of computing resources; a workload discovery engine to identify pending workload tasks to be scheduled for execution from one or more workload queues and to update the local cache with the identified workload tasks; a policy engine to identify a Service Level Target (SLT) for each of the workload tasks identified and to update the local cache with the SLT for each workload task identified; and a scheduler to schedule each workload task for execution via one of the computing resources available based on which of the computing resources are estimated to meet the SLT. Other related embodiments are disclosed.

28 Claims, 19 Drawing Sheets

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,514,951 B2 | 12/2019 | Bahramshahry et al. |
| 10,545,796 B2 | 1/2020 | Bahramshahry et al. |
| 10,990,850 B1 | 4/2021 | Chen |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0005181 A1* | 1/2006 | Fellenstein .............. G06F 8/61 717/174 |
| 2009/0177744 A1 | 7/2009 | Marlow et al. |
| 2011/0173626 A1* | 7/2011 | Chi .................. G06F 9/5072 718/103 |
| 2014/0245298 A1 | 8/2014 | Zhou et al. |
| 2016/0283268 A1* | 9/2016 | Di Balsamo .......... G06F 9/4887 |
| 2018/0276040 A1 | 9/2018 | Hosmani et al. |
| 2019/0391880 A1 | 12/2019 | Wang et al. |
| 2020/0026562 A1 | 1/2020 | Bahramshahry et al. |
| 2020/0026563 A1 | 1/2020 | Bahramshahry et al. |
| 2020/0026564 A1 | 1/2020 | Bahramshahry et al. |
| 2020/0026569 A1 | 1/2020 | Bahramshahry et al. |
| 2020/0026571 A1 | 1/2020 | Bahramshahry et al. |
| 2020/0026579 A1 | 1/2020 | Bahramshahry et al. |
| 2020/0026580 A1 | 1/2020 | Bahramshahry et al. |
| 2020/0110675 A1 | 4/2020 | Wang et al. |

OTHER PUBLICATIONS

U.S. Appl. No. 16/774,550, filed Jan. 28, 2020, Armin Bahramshahry.

A Power-Aware, Best-Effort Real-Time Task Scheduling Algorithm, dated 2003 by Wang et al., 8 pages.

Bansal, et al., "Dynamic Task-Scheduling in Grid Computing using Prioritized Round Robin Algorithm," Mar. 2011, IJCSI International Journal of Computer Science, col. 8, Issue 2, pp. 472-477.

Calheiros et al., "Meeting Deadlines of Scientific Workflows in Public Clouds with Tasks Replication," Sep. 2013, IEEE, vol. 25, pp. 1787-1796.

Dobber, et al., "Dynamic Load Balancing and Job Replication in a Global-Scale Grid Environment: A Comparison," Apr. 2008, pp. 207-218.

Notice of Allowance for U.S. Appl. No. 15/587,188, dated Sep. 9, 2019, 7 pages.

(56) References Cited

OTHER PUBLICATIONS

Notice of Allowance for U.S. Appl. No. 16/528,617 dated Jun. 18, 2020, 9 pages.
Notice of Allowance for U.S. Appl. No. 16/528,619, dated Nov. 16, 2020, 14 pages.
Notice of Allowance for U.S. Appl. No. 15/587,161, dated Aug. 7, 2019, 16 pages.
Office Action for U.S. Appl. No. 15/587,161, dated Apr. 17, 2019, 19 pages.
Office Action for U.S. Appl. No. 15/587,188, dated May 13, 2019, 19 pages.
Office Action for U.S. Appl. No. 16/528,610 dated May 19, 2021, 11 pages.
Office Action for U.S. Appl. No. 16/528,611 dated May 25, 2021, 10 pages.
Office Action for U.S. Appl. No. 16/528,613 dated May 28, 2021, 10 pages.
Office Action for U.S. Appl. No. 16/528,615 dated Jun. 1, 2021, 11 pages.
Office Action for U.S. Appl. No. 16/528,619 dated Jul. 2, 2020, 10 pages.

\* cited by examiner

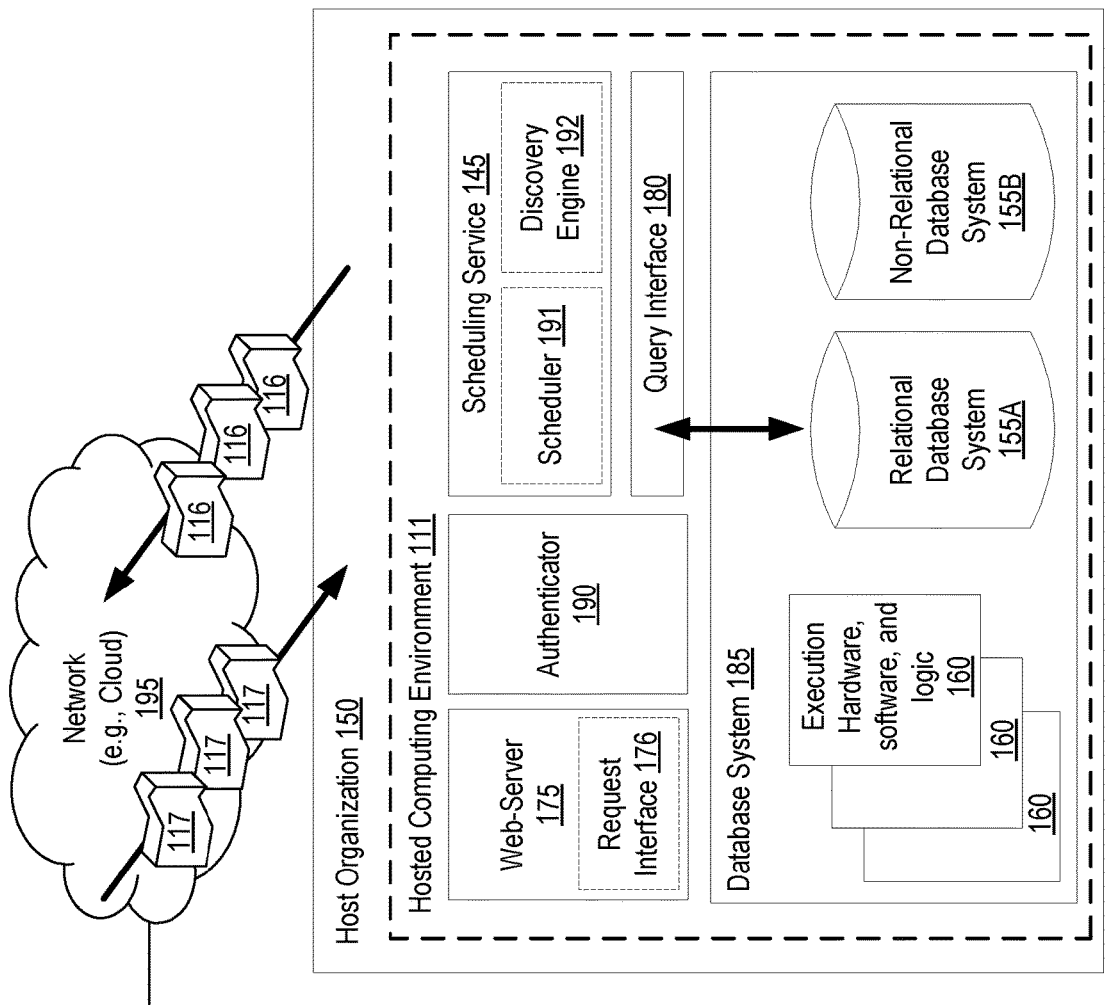
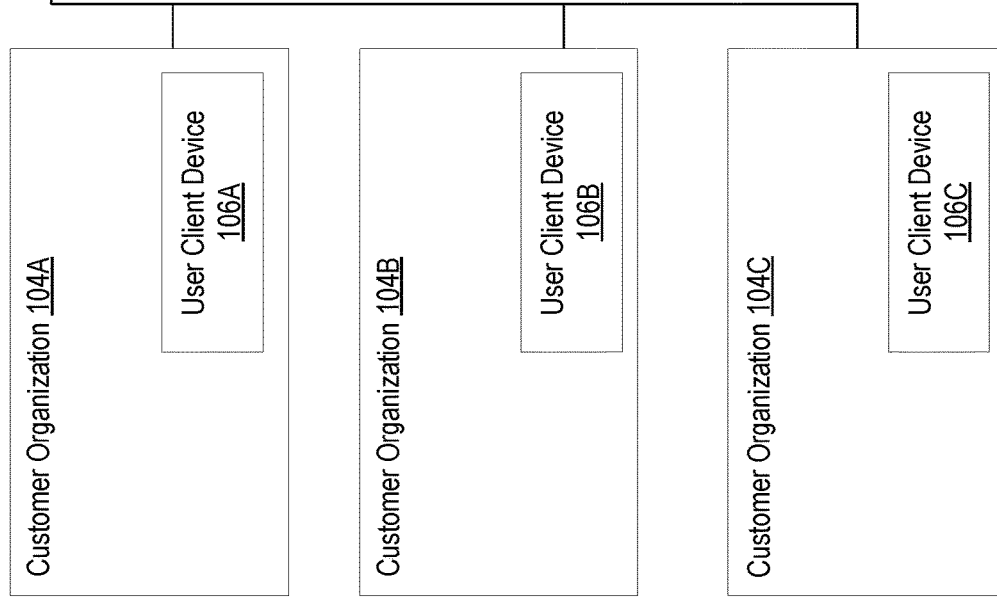
FIG. 1A

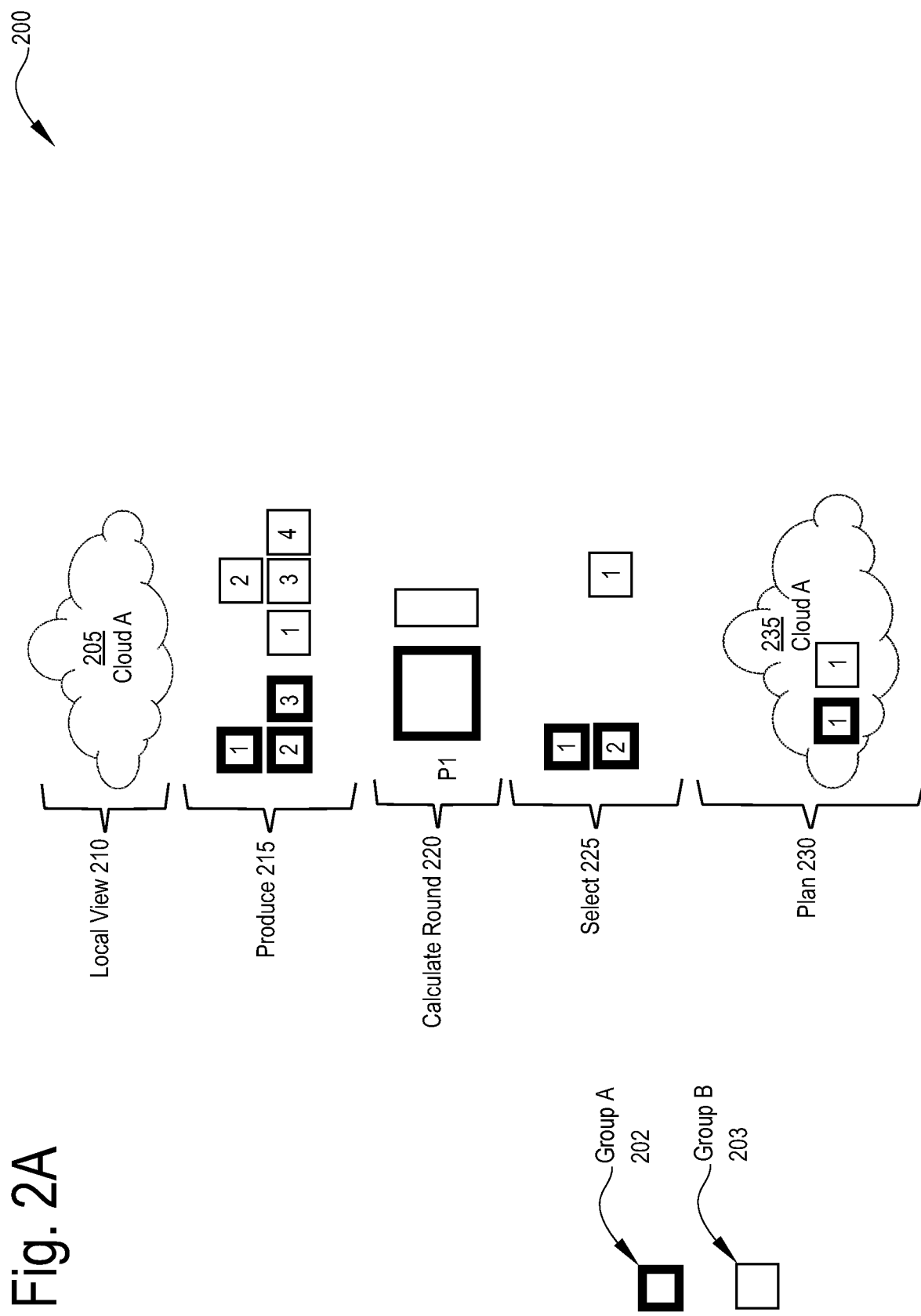

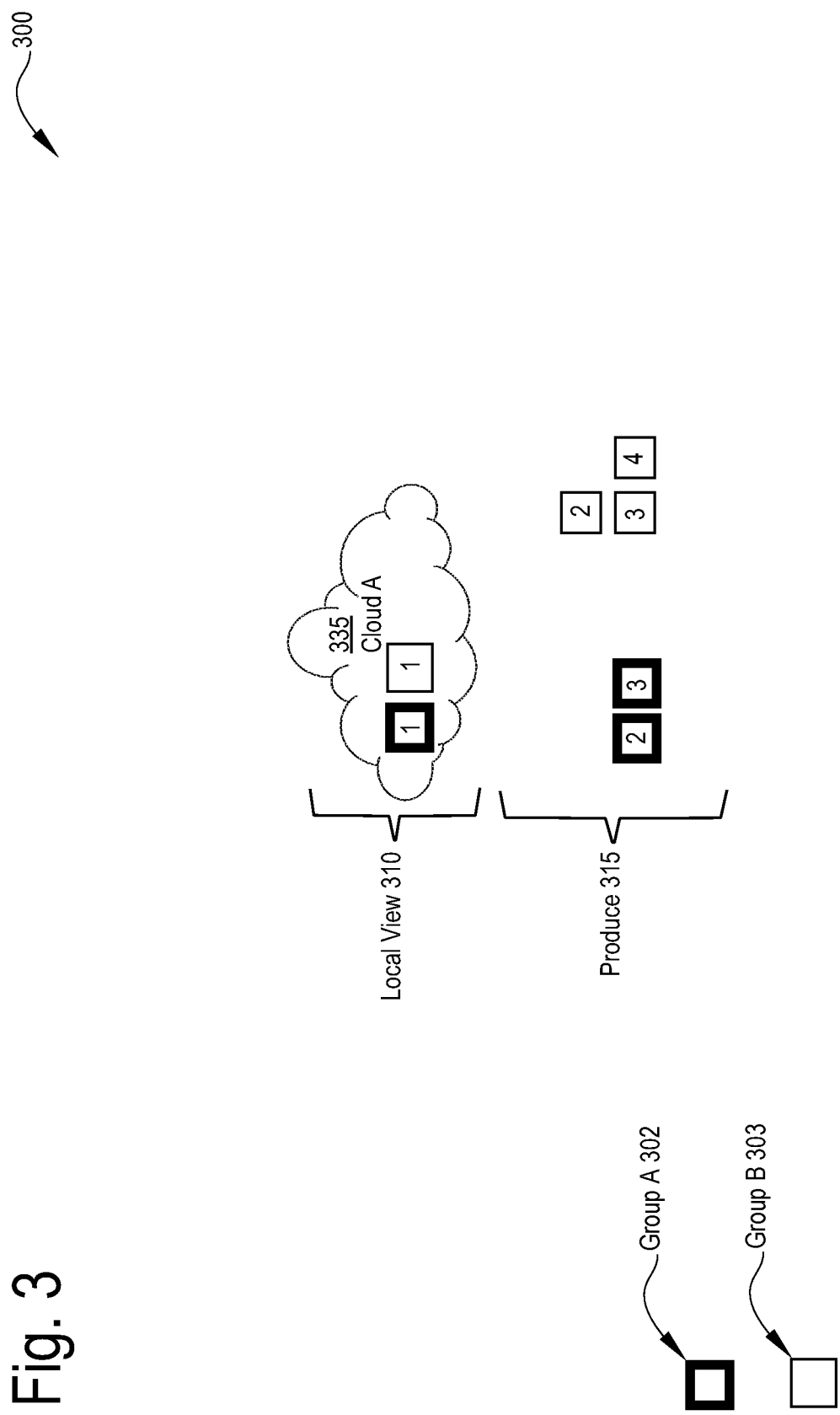

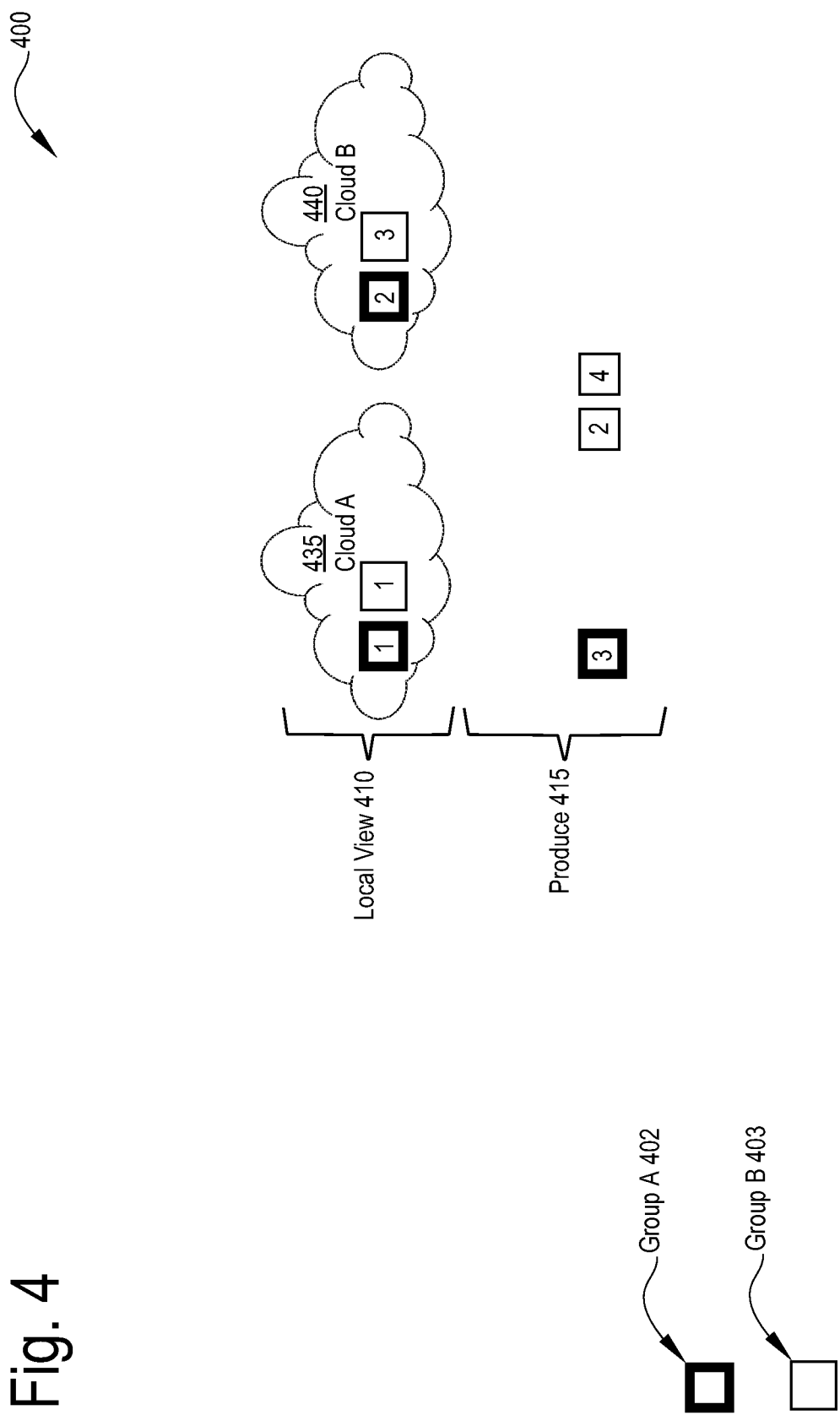

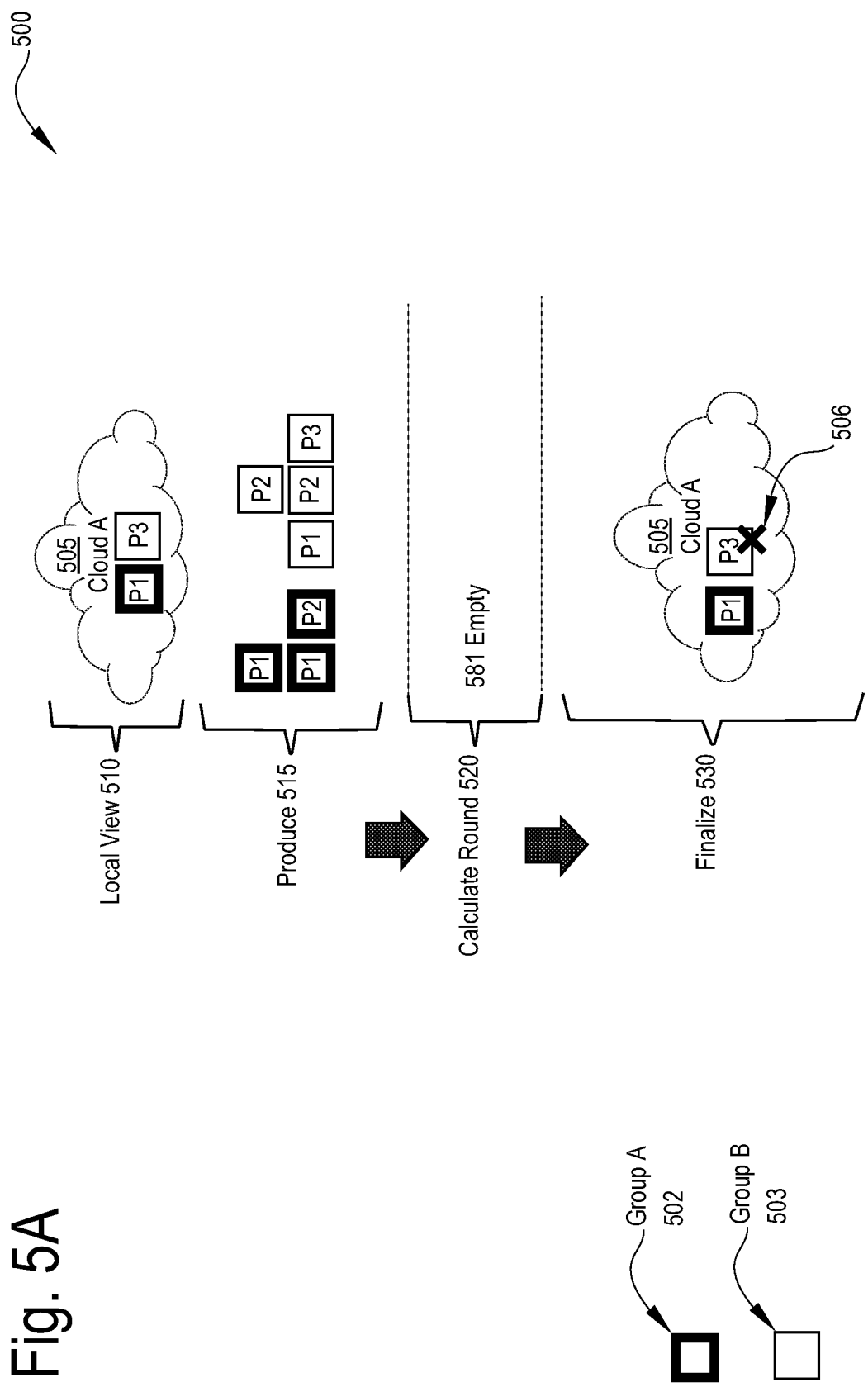

SYSTEMS, METHODS, AND APPARATUSES FOR IMPLEMENTING A SCALABLE SCHEDULER WITH HETEROGENEOUS RESOURCE ALLOCATION OF LARGE COMPETING WORKLOADS TYPES USING QOS

CLAIM OF PRIORITY

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for systems, methods, and apparatuses for implementing a stateless, deterministic scheduler and work discovery system with interruption recovery supported by a processor and a memory to execute such functionality. Additional disclosed embodiments are related to systems, methods, and apparatuses for implementing a scalable scheduler with heterogeneous resource allocation of large competing workloads types using Quality of Service (QoS) requirements. Other disclosed embodiments are related to systems, methods, and apparatuses for implementing a scheduler with preemptive termination of existing workloads to free resources for high priority items supported by a processor and a memory to execute such functionality. Any such disclosed means may be implemented within the computing architecture of a hosted computing environment, such as an on-demand or cloud-computing environment, which utilizes multi-tenant database technologies, client-server technologies, traditional database technologies, or other computing architecture in support of the hosted computing environment.

BACKGROUND

The subject matter discussed in the background section is not to be assumed as prior art merely as a result of its mention in the background section. Similarly, a problem mentioned in the background section or associated with the subject matter of the background section is not assumed to have been previously recognized in the prior art. The subject matter in the background section merely represents different approaches, which in and of themselves may also correspond to claimed embodiments.

In the context of computing, scheduling is the method by which specified workloads are assigned to resources which are then responsible for completing the workloads. Such workloads may be, for example, virtual computation elements such as threads, processes, and data flows. The scheduling process applies available hardware resources such as processors, memory, hard drive space, network links, network addresses or IP (Internet Protocol) addresses, expansion cards, and so forth.

A scheduler responsible for performing the scheduling processes and generally will seek to perform a variety of functions in addition to scheduling work, such as optimizing utilizing of resources through a load balancing process which thus permits multiple users to share system resources more effectively.

Implementation of a scheduler is a technically complex task as there exist many criteria which affect operation of the scheduler and may in turn affect perceived performance of the underlying computing resources based on how the scheduler allocates resources and prioritizes competing needs.

Unfortunately, conventional schedulers fail to adequately address the needs of specified Quality of Service (QoS) targets or Service Level Targets (SLTs) such as those defining an exemplary 95th percentile expected completion time and resource usage for a given task. Moreover, it may be impossible to prove the correctness of a scheduling algorithm implemented by conventional schedulers as they generally lack sufficient extendibility and maintainability criteria.

The present state of the art may therefore benefit from the variously disclosed schedulers including the systems, methods, and apparatuses for implementing: (i) the stateless, deterministic scheduler and work discovery system with interruption recovery which is described herein; (ii) the scalable scheduler with heterogeneous resource allocation of large competing workloads types using Quality of Service (QoS) requirements which is described herein; and (iii) the scheduler with preemptive termination of existing workloads to free resources for high priority items, which is also described herein. Each of the described scheduler means are additionally operable within a cloud based computing environment in accordance with the described embodiments set forth below.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A depicts an exemplary architecture in accordance with described embodiments;

FIG. 2A depicts an exemplary scheduling scheme as implemented by the scheduling service in accordance with described embodiments;

FIG. 3 depicts another exemplary scheduling scheme as implemented by the scheduling service in accordance with described embodiments;

FIG. 4 depicts another exemplary scheduling scheme as implemented by the scheduling service in accordance with described embodiments;

FIG. 5A depicts another exemplary scheduling scheme as implemented by the scheduling service in accordance with described embodiments;

DETAILED DESCRIPTION

Figure 1B:
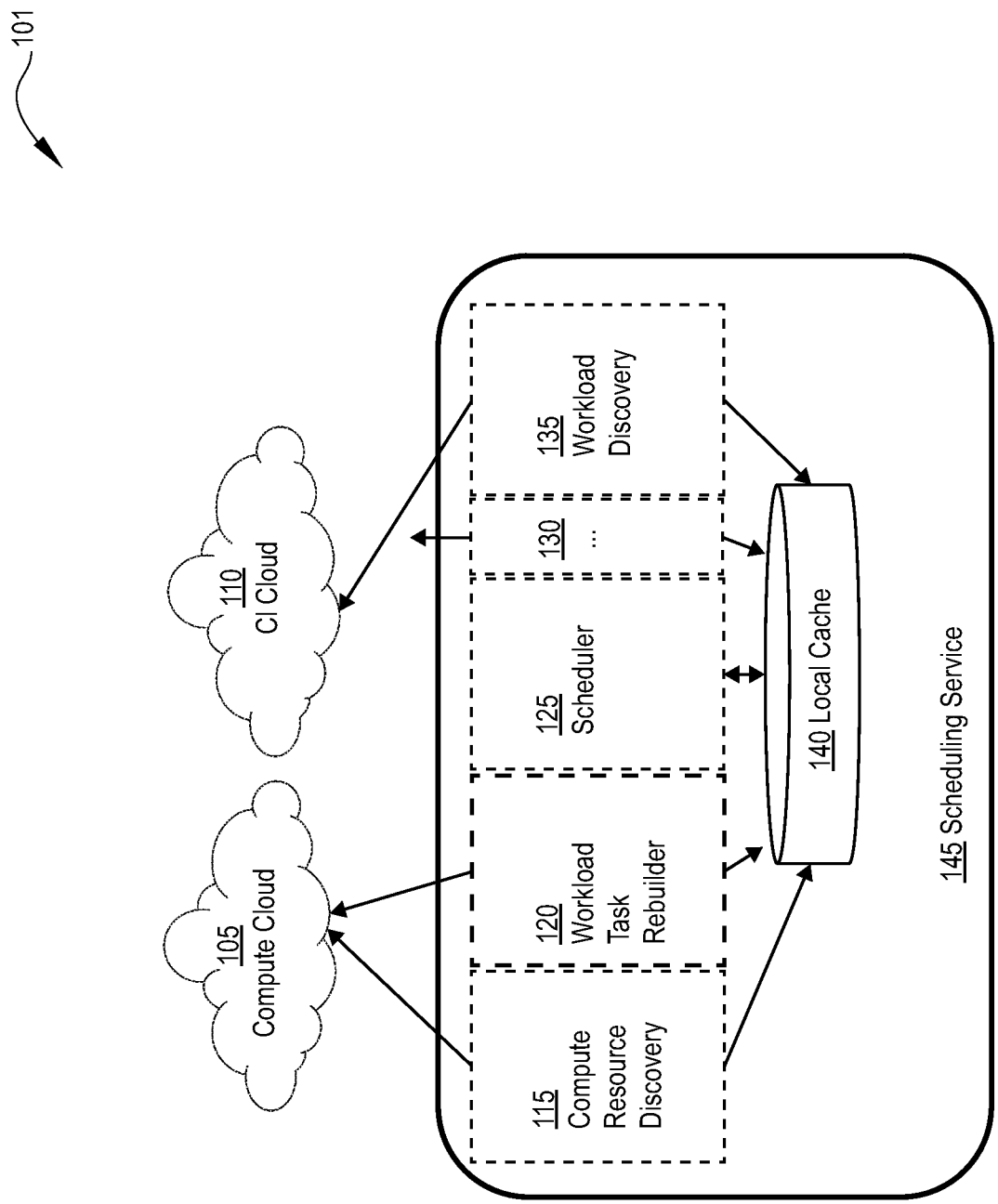
FIG. 1B depicts the scheduling service in additional detail and operating within an alternative stand-alone architecture in accordance with described embodiments.

Also described herein are systems, methods, and apparatuses for implementing a scalable scheduler with heterogeneous resource allocation of large competing workloads types using Quality of Service (QoS) requirements, such a scheduler being operable within a cloud-based computing environment. For instance, according to one embodiment, there is disclosed a system to implement a scheduling service, in which the system includes: a processor and a memory to execute instructions at the system; a local cache allocated within the memory of the system; a compute resource discovery engine to identify a plurality of computing resources available to execute workload tasks, the computing resources residing within any one of private or public datacenters or third party computing clouds and a plurality of resource characteristics for each of the plurality of computing resources identified; in which the compute resource discovery engine is to fill the local cache with information representing each of the identified computing resources available and the plurality of resource characteristics identified for each of the plurality of computing resources; a workload discovery engine to identify pending workload tasks to be scheduled for execution from one or more workload queues and to update the local cache with the identified workload tasks; a policy engine to identify a Service Level Target (SLT) for each of the workload tasks identified and to update the local cache with the SLT for each workload task identified; and a scheduler to schedule each workload task for execution via one of the computing resources available based on which of the computing resources are estimated to meet the SLT.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 150. In one embodiment, a database system 185 includes databases 155A and 155B, for example, to store application code, object data, tables, datasets, and underlying database records with user data on behalf of customer organizations 104A-C (e.g., users of such a database system 185 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 185 or alternatively, a computing grid, or a pool of work servers, or some combination of hosted computing architectures may be utilized to carry out the computational workload and processing demanded of the host organization 150 in conjunction with the database system 185.

The database system 185 depicted in the embodiment shown includes a plurality of underlying hardware, software, and logic elements 160 that implement database functionality and a code execution environment within the host organization 150.

In accordance with one embodiment, database system 185 utilizes the underlying database system implementations 155A and 155B to service database queries and other data interactions with the database system 185 which communicate with the database system 185 via the query interface. The hardware, software, and logic elements 160 of the database system 185 are separate and distinct from a plurality of customer organizations (104A, 104B, and 104C) which utilize web services and other service offerings as provided by the host organization 150 by communicably interfacing to the host organization 150 via network 195. In such a way, host organization 150 may implement on-demand services, on-demand database services or cloud computing services to subscribing customer organizations 104A-C.

Further depicted is the host organization 150 receiving input and other requests 117 from a plurality of customer organizations 104A-C via network 195 (such as a public Internet). For example, incoming search queries, database queries, API requests, interactions with displayed graphical user interfaces and displays at the user client devices 106A-C, or other inputs may be received from the customer organizations 104A-C to be processed against the database system 185, or such queries may be constructed from the inputs and other requests 117 for execution against the databases 155 or the query interface 180, pursuant to which results 116 are then returned to an originator or requestor, such as a user of one of a user client device 106A-C at a customer organization 104A-C.

In one embodiment, each customer organization 104A-C is an entity selected from the group consisting of: a separate and distinct remote organization, an organizational group within the host organization 150, a business partner of the host organization 150, or a customer organization 104A-C that subscribes to cloud computing services provided by the host organization 150.

In one embodiment, requests 117 are received at, or submitted to, a web-server 175 within host organization 150. Host organization 150 may receive a variety of requests for processing by the host organization 150 and its database system 185. Incoming requests 117 received at web-server 175 may specify which services from the host organization 150 are to be provided, such as query requests, search request, status requests, database transactions, graphical user interface requests and interactions, processing requests to retrieve, update, or store data on behalf of one of the customer organizations 104A-C, code execution requests, and so forth. Web-server 175 may be responsible for receiving requests 117 from various customer organizations 104A-C via network 195 on behalf of the query interface 180 and for providing a web-based interface or other graphical displays to an end-user user client device 106A-C or machine originating such data requests 117.

The query interface 180 is capable of receiving and executing requested queries against the databases and storage components of the database system 185 so as to return a result set, response, or other requested data in furtherance of the methodologies described. The query interface 180 additionally provides functionality to pass queries from web-server 175 into the database system 185 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 150 may implement a request interface 176 via web-server 175 or as a stand-alone interface to receive requests packets or other requests 117 from the user client devices 106A-C. Request interface 176 further supports the return of response packets or other replies and responses 116 in an outgoing direction from host organization 150 to the user client devices 106A-C.

Authenticator 190 operates on behalf of the host organization to verify, authenticate, and otherwise credential users attempting to gain access to the host organization.

Still further depicted within the hosted computing environment 111 is the scheduling service 145 having therein both a scheduler 191 and also a discovery engine 192 capable of discovering available compute resources by which to complete workloads and further capable to discover pending workloads awaiting assignment to compute resources. As depicted here, the scheduling service 145 is hosted within host organization 150 as a cloud based service, however, the scheduling service 145 may optionally be provided as a separate scheduling platform external to the host organization 150 or provided by a different host organization.

FIG. 1B depicts the scheduling service 145 in additional detail and operating within an alternative stand-alone architecture 101 in accordance with described embodiments.

More particularly, there is depicted within the scheduling service 145 a local cache 140 which is communicably interfaced with each of a compute resource discovery 115 component, a workload task rebuilder 120 component, the scheduler 125, a workload discover 135 component, and additional scheduling functions 130. Each of the depicted components are in turn communicably interfaced with a compute cloud 105 and a Continuous Integration (CI) cloud 110 or a Continuous Integration Software (CI software)

cloud. Each of the components may be interfaced with the compute cloud 105 and the CI cloud 110 from within the previously depicted host organization 150 of FIG. 1A or may alternatively be interfaced to the compute cloud 105 and the CI cloud 110 from a stand-alone scheduling service 145 architecture 101 such as that which is depicted at FIG. 1B.

By providing multiple separate and discreet services, each capable of updating the local cache 140 view of the scheduler 125, the scheduler is freed from the responsibility of collecting such information and integrating the requisite information within the local cache 140 and may therefore apply its computational resources specifically to the scheduling functions.

In such a way, the scheduler 125 is enabled to utilize the local cache 140 to make decisions on resource allocation while leveraging the various services to monitor external resources as well as utilizing the separate services including the compute resource discovery 115 component and the workload discovery 135 component to rediscover and re-import or update the status of any running tasks on the externally provided compute resource pools. For instance, resource pools or third party clouds may go online and offline or may become available to perform work or be wholly consumed and therefore unavailable to perform work. There are additional factors which may change such as pricing and preference and performance metrics, each of which may likewise be monitored and updated by the compute resource discovery 115 component of the scheduling service 145.

By updating the local cache 140 with any recently discovered tasks, the scheduler 125 will make the correct decisions based on the most up to date information available without being burdened by having to maintain such information or collect and store such information as part of the scheduling process. According to one embodiment there is a separate monitor for every available computing cloud and each monitor continuously updates the local cache 140 on behalf of the scheduler. Therefore, where there is both a compute cloud 105 and a CI cloud 110, there may be two separate and distinct monitors, one for each cloud, with each of the monitors observing their respectively associated cloud and updating the local cache 140 on behalf of the scheduler 125 with updated information and metrics as they become available to the monitors.

According to a particular embodiment, every time a new compute cloud is discovered or re-discovered, the workload discovery 135 component will then query that discovered compute cloud requesting all running tasks and completed tasks, at which point the workload discovery 135 component will then update the local cache 140 on behalf of the scheduler 125 so as to fully describe the present state of the newly discovered or rediscovered compute cloud. During any subsequent scheduling cycle, the scheduler 125 will then reference the local cache 140 and thus make scheduling and planning determinations based upon the most up to date and relevant information without having to go and collect such information.

The scheduling service 145 provides means by which to dynamically allocate compute capacity at anytime, such as allocating CPU, RAM, IP, etc., as necessary for performing a specific type of work according to need. Such compute capacity may exist within a large cloud-based and on-demand host organization, which provides computing resources to customers as a service. Certain clouds provide very large pools of heterogeneous resources capable of processing very large sets or many small sets of heterogeneous workloads.

The scheduling service 145 is further enabled to prioritize resource allocation according to need for any given type of workload with the specified QoS of the workload provided in the form of a Service Level Target (SLT). An exemplary SLT may define the 95th percentile expected completion time and resource usage for a given task, for a given user, for a given customer organization, etc.

The scheduler 125 as described herein is highly adaptable yet operates without requiring any perfect single scheduling algorithm, which may arguably be impossible to develop. Rather, by utilizing iterative processing, a simplistic scheduling policy may be utilized for initial planning, allocation, and selection, while permitting subsequent iterations to improve upon the initial or prior planning, allocation, and selection determinations based on current information.

For instance, accordance to a particular embodiment, the scheduler 125 independently determines where resources are allocated on an iterative cycle, such as minute by minute, or other iterative timing loop. Moreover, the describe scheduler 125 embraces an eventual consistency design thus permitting for a highly decoupled scheduler implementation. According to described embodiments, the scheduler 125 dynamically discovers workload and resources via its workload discovery 135 and compute resource discovery 115 components respectively. Moreover, such a scheduler 125 dynamically reacts to workload types and workload requirements and recognizes all the requirements or other criteria that must be met for any given type of workload. Because the scheduler 125 is extendable via other functions 130 there are further optimizations that may be permissibly developed by users, customers, or other developers interested in providing add-ons to the core scheduling service 145.

Such a scheduler 125 may be utilized for scheduling in general application workloads such as for a CRM application, used for scheduling workloads associated with web servers and other application infrastructure owned by the host organization, used for allocation and scheduling of virtualized resources such as those allocated to Virtual Machines (VMs), used for Software Defined Data Center bring-up or reallocation, used for Salesforce.com specific "Force" Application Models, Kubernetes, and Orchestration engines, as well as used for expanding or contracting to accommodate non-linear workloads such as seasonal and cyclical workloads.

The scheduler 125 is decoupled from the underlying workloads and compute resources by embracing an eventual consistency such that separate functional components within the scheduling service 145 are responsible for gathering the requisite data on behalf of the scheduler and making such data available by caching the needed information in the local cache 140 for fast retrieval and processing.

For instance, information provided and cached within the local cache 140 by the components of the scheduling service 145 include a list of available resources, a list of workload types and the resource requirements for those workload types, and a list of jobs for each of the workload types that need to be performed.

According to described embodiments, the scheduler takes into account the quality of service or a Service Level Target (SLT) for every workload type performed. For instance, workload tasks will require some amount of time to process regardless of what computing architecture they are executed against, however, the SLT for a given workload type may specify a priority or an expected completion time or an acceptable amount of processing time or an acceptable cost to complete the processing and so forth.

Based on the specified SLT, the scheduler will dynamically allocate capacity for different types of work as scheduled so as to perform the scheduled work in a manner consistent with the specified SLT for those workloads. Not all workload tasks are equal, however, and thus, the scheduler must accommodate the different computational burdens, the different computational and architecture requirements, and the different Quality of Service (QoS) or SLT expectations for each workload task, with every scheduled task being in contention for limited resources with all other scheduled workload tasks.

Conventional solutions utilize a status allocation model in which a prediction is made for any scheduled work or expected work in terms of how much computing resources should be reserved. Unfortunately, such a model locks up resources for defined periods of time and risks having sub-sets of computing resources sitting idle or under-utilized if the expected workload does not arrive while other computing resources are over-utilized or the overall system is indicating an over-allocated state and therefore refusing to accept new work leading to overall performance degradation.

Through a dynamic allocation process as implemented by the scheduling service it is possible to realize both more efficient computing architecture utilization while simultaneously delivering greater compliance with expected QoS and SLTs.

The scheduling service must make many decisions in quick succession and therefore, the various services are provided to support the scheduler's core function of creating, selecting, and planning the execution of tasks.

Therefore, all of the information which will be utilized by the scheduler as part of its decision process to create, select, and schedule workload tasks are kept locally within the local cache 140 so as to ensure very fast access and eliminate any latency associated with the scheduler attempting to retrieve such information from their original source.

Because the scheduler 125 pulls all requisite information from the local cache 140, it is the responsibility of the various components to retrieve and populate the local cache 140 with the relevant information as well as maintain such information on behalf of the scheduler 125, including updating the information within the local cache 140 as necessary.

By decoupling the compute resource discover 115 component and the workload task rebuilder 120 component and the workload discovery 135 component from the scheduler 125 the local cache may be maintained without burdening the scheduler or inducing latency within the scheduler.

As depicted here there are two principle resources accessible to the scheduling service. The compute cloud 105 provides computing architecture upon which workload tasks may be performed and the CI cloud 110 is where the work that needs to be performed is discovered such that it may be scheduled for execution. Consider for instance a software platform with multiple change lists and many configuration variations, all of which require testing. Such software platform variants requiring test may be hosted within the Continuous Integration (CI) cloud 110 to be discovered and ultimately scheduled for execution via the compute cloud 105.

The compute cloud 105 and CI cloud 110 do not necessarily have to be associated with the scheduling service 145 or even the host organization within which the scheduling service 145 operates. For instance, the compute cloud 105 and CI cloud 110 may be controlled by a third party cloud computing service such as Google or Amazon, etc. The compute resource discovery 115 component discovers and defines the available compute clouds 105 as well as their hardware and performance characteristics and other metrics such as licenses, pricing, software builds, operating system (e.g., mac, Windows, Linux, etc.), patch levels, permissibility to execute generic virtual machines (VMs), cost or budget to utilize a particular machine, permissibility of executing a single VM and OS license with one or many CPUs, and so forth. If one of the computing clouds 105 expands its hardware offerings or changes its available capacity in some way, then the compute resource discovery 115 component which monitors the compute clouds 105 will discover such a change and update the local cache accordingly.

In such a way, the compute resource discovery 115 component constantly observes, monitors, and interacts with the available compute clouds 105 and updates the local cache as appropriate such that the scheduler may then have access to the latest and most accurate information with which to schedule workload tasks for execution without obligating the scheduler 125 itself to seeking out or requesting such information as part of the scheduling process which could induce undesirable latency problems. Rather, the compute resource discovery 115 component creates a representation of the relevant information on behalf of the scheduler 125 and stores and maintains such a representation within the local cache which is accessible to the scheduler 125.

The CI cloud 110 or continuous integration cloud 110 lists the many tests, check-ins, validations, and other work constantly on-going within the host organization on behalf of its customer organizations and on behalf of its internal software offerings. The CI cloud 110 lists such work and permits the scheduler's workload discover 135 to discover the work and represent those tasks within the local cache where they may then be picked up for selection and planning by the scheduler 125 to be executed at any one of many accessible compute clouds 105.

According to a particular embodiment, the additional scheduling functions 130 are expandable by other developers which may create a component to update the local cache 140 with their own representation of workload tasks to be scheduled for execution by the scheduler 125. Because each developer may create their own expansion to the scheduling functions 130 there is a reduced likelihood of the developers' code and tasks conflicting with one another. Rather, the information is assimilated within the local cache and then retrieved by the scheduler 125 as part of its processing. The developers may utilize the expandable scheduling functions 130 to specify their SLT requirements and other policy considerations such as pricing, licensing requirements, software requirements, and so forth for their workload tasks which will then be represented within the local cache.

According to a particular embodiment, each software variant may require a distinct image or a specific operating system configuration or a specific version of patches, etc. Such requirements are identified to the scheduler so that the testing may then be matched against a base image meeting the particular requirements as specified for testing that particular software variant. For instance, a workload task for testing a particular version may specify that for that task a specifically identified base image must be utilized to ensure correct execution of the test sequence embodied within the workload task.

Because the scheduler must handle thousands of incoming workload tasks it is undesirable to reference the database system of the host organization for every transaction as doing so requires a processing delay which undermines the performance of the scheduler. It is therefore in accordance with described embodiments that the scheduler makes all scheduling and prioritization decisions exclusively upon data and information stored within the local cache, with such information being maintained within the local cache by the other components of the scheduling service 145, such as the compute resource discovery component 115 and the workload discovery component 135.

In such a way, the components of the scheduling service other than the scheduler 125 itself operate as auxiliary services which are responsible to reach out and query various computing clouds to check whether they are accessible and available and what workload tasks they are presently executing or have completed, with such auxiliary services then updating the local cache on behalf of the scheduler 125.

Figure 1C:
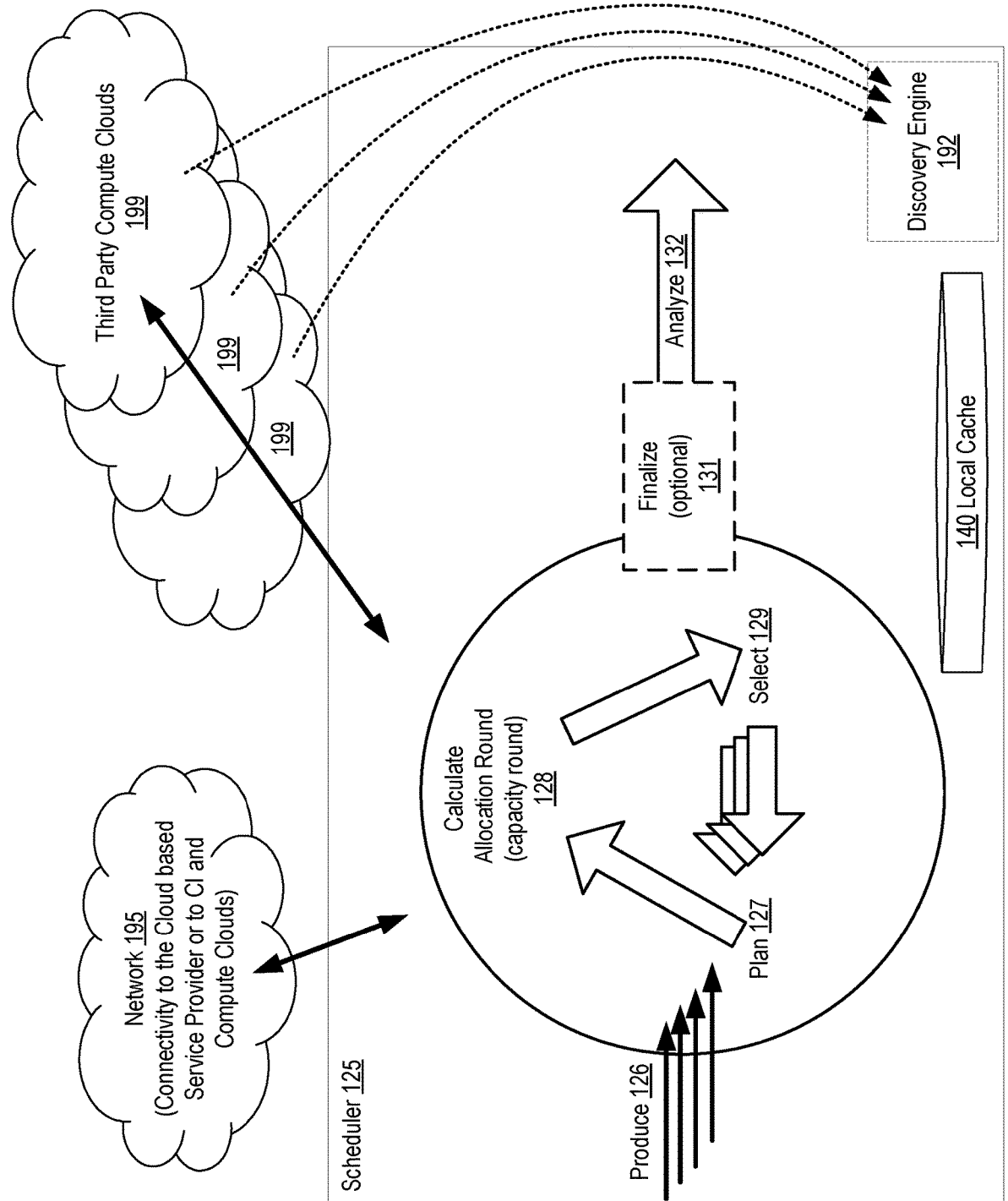
FIG. 1C depicts additional functions of the scheduler in greater detail in accordance with described embodiments.

FIG. 1C depicts additional functions of the scheduler 125 in greater detail in accordance with described embodiments.

More particularly, there is depicted the scheduler 125 being communicatively interfaced with network 195, for instance, providing connectivity to the cloud based service provider or to the Continuous Integration (CI) cloud and the compute cloud. Further depicted within the additional functions of scheduler 125 are a production or a produce 126 operation which generates work or enqueues work to be performed. Work is then planned 127 subsequent to which a calculate allocation round 128 is performed and work is selected 129, in which the plan 127, calculation allocation 128, and select 129 operations may be iteratively repeated as workloads flow into and out of the scheduler. The finalize 131 and analyze 132 operations then evaluate the selected 129 work in the context of required or expected performance metrics.

Additionally depicted is the discovery engine 192 capable of identifying accessible and on-line third-party compute clouds 199 as well as querying the third-party compute clouds for information such as currently executing workload tasks, workload task types supported, completed workload tasks, and other possible metrics, such as cost, performance, etc.

According to described embodiments, such a scheduler 125 may implement simple and deterministic policies which are easily understandable, extendable, testable, and debuggable. Such a scheduler may therefore generate sub-optimal results, yet through the iterative processing permit improvement as the scheduler cycles over and over evaluating and analyzing the work to be performed and making its allocations. Moreover, though the analysis 132 phase it is possible then to make adjustments to the output and selected 129 work as determined by the scheduler.

Within the scheduling service 145 from FIG. 1B, the scheduler 125 as depicted here works from locally cached data and to allocate the available resources using the following exemplary allocation scheme. For instance, the scheduler 125 first produces 126 all tasks possible for a given workload type along with an associated priority for each task, with the production operating in isolation from other workload types. Next, the scheduler calculates a next allocation round 128 including the round's priority and allowed resources for each workload type. Selection 129 to capacity then proceeds by first selecting tasks for each workload type from the produced set of tasks according to both the round's priority and also the workload type's resource allocation. Planning 127 then effectuates a stated plan for the given round according to all tasks that were selected for that round and according also to the available resources for that round.

For a next capacity round, the scheduler then proceeds to calculate the next capacity round by taking into account the recently planned tasks at phase 127 and then the scheduling cycle is optionally finalized 131. A subsequent analyze 132 phase then applies post-scheduling analysis to check any decisions made during the scheduler's allocation rounds to check for potential scheduling improvements for future rounds.

Notably, the production 126 phase is agnostic as to total available capacity and rather, simply generates all possible work which remains pending, regardless of whether or not capacity exists for such work. Rather the produce 126 phase prepares a comprehensive list of all pending work for a single workload type. Ideally, the scheduler would begin its calculate allocation round 128 phase on the assumption that an infinite amount of resources exist, however, in reality, the tasks are prioritized and therefore, the producer 126 additionally specifies the importance or priority for every task created according to the workload type's SLT or required QoS.

The capacity round implements a round-robin resource allocation which singularly focuses on available capacity without any consideration whatsoever of how many tasks were produced or the priority of any given task or any logical considerations as to planning or task selection. Rather, the capacity round simply considers available capacity, evaluates the requirements for each type of workload, and calculates whether or not sufficient resources exist for one more instance allocation of the tasks for that given workload type during the present round. If resources are available to allocation another instance of a pending task, then the round-robin capacity round process simply allocates that instance. The scheduler 125 then iterates through as many rounds as required to either exhaust all available resources or exhaust all produced tasks.

According to a particular embodiment, there is a starvation check implemented by the scheduler 125. In the context of computing, starvation is a problem with concurrent computing processes where one process is perpetually denied necessary resources to complete its work. Therefore, according to one embodiment, starvation is avoided by configuring the capacity round to begin allocating at very low percentage of the total available resources and then gradually increasing the allocated percentage in subsequent rounds. Each round is also assigned a specified priority and thus, early rounds begin with high priority tasks and gradually decrease the priority to permit allocation of lower priority tasks via the scheduler 125.

Selection 129 of tasks is similar to the production 126 of tasks as there is no consideration of available capacity or any consideration given to other possible workload types. However, unlike the production 126 phase which creates the tasks the selection 129 phase is solely responsible for selecting from the list of previously created tasks.

Upon reaching the selection 129 phase, it is known precisely which tasks are to be executed for the given workload type and which compute resources are specifically required to perform those tasks as well as the prioritization for the current round. Based on this information, a most appropriate task that will fit within the specified resources is selected.

At the planning 127 phase, the scheduler knows precisely which tasks for which workload types are selected for execution and then proceeds to allocate the resources from the available pool of resources accordingly. Considering the heterogeneous nature of resources and workloads, the planner 127 may be utilized to allocate resource for the most efficient utilization or for best performance (e.g., the fastest execution). Other considerations may likewise be employed, such as the lowest cost resources or the most preferred among two or more resources from competing clouds.

When utilized, the optional finalize 131 operation evaluates all of the produced 126, selected 129, and planned 127 tasks, as well as the available resources and applies final optimizations to the resulting selection and allocation. For instance, the finalize 131 operation may be utilized to help guide future production, selection, and planning of resource allocation in the form of aging, bookkeeping, or other optimizations such as starvation avoidance or more effective utilization of resources to meet SLTs and QoS requirements.

It is therefore in accordance with such embodiments that the scheduling service 145 implements a framework having concrete and individualized operations, each of which themselves have well defined input/output. Together, the components of the scheduling service 145 are enabled to schedule even very complicated resource and work requirement combinations. Further still, because each phase of operation is individualized and lacking in complexity due to the clearly defined division of responsibility for each of the various operations, it is possible to implement deterministic policies for each of the operations which will integrate and interoperate through the scheduling service.

While such an adaptive scheduler may appear nondeterministic the output itself is deterministic and through a set of small and well defined policies to construct such a scheduler 125, it is thus possible to both maintain and also extend the scheduler to support new features, requirements, types of workloads, or any other type of customization required or desired by consumers.

For instance, such policies may be specific to the workload types and produced tasks being processed while having no function for other non-specified workload types to which such policies do not apply. For instance, there may be a scheduler having resources on multiple compute service providers or multiple distinct clouds. Such scheduler may therefore be made to recognize, through such policies, a continuous integration (CI) software implementation such as that depicted at FIG. 1B. Because the scheduler utilizes separate services by communicating with a variety of available computing pools, including cloud-based resources provided by third-party and external service providers, the compute resource discovery component (e.g., element 115 of FIG. 1B) may discover the presence of such resources and write such information to the local cache from which the scheduler may then read from local cache during the scheduling process and allocate workload to the third party cloud or to the services provided by an external service provider. Because the discovery mechanism writes the information to local cache the scheduler may continue to operate in a fast and efficient manner without having to stop the scheduling operations to reach out and discover or inquire as to potentially available resources and workload task support from the third party or external service providers. Even where the scheduler is to allocate to compute resources provided within the host organization for a scheduling service also operating within the same host organization, the local cache and compute resource discovery means serve to keep the scheduling service operating in a fast and efficient manner.

As shown here, the initial produce 126 operation is responsible for producing a list of all possible jobs for a given workload type during any particular cycle, without any regard whatsoever to the available capacity to perform such work. Rather, the produce 126 function builds a list of jobs that have not yet been planned for execution and indeed are not yet executing, and thus require scheduling. Such jobs will be listed by the produce 126 operation regardless of their priority as well as it is the responsibility of the produce operation 126 to produce or create a fully exhaustive list, whereas subsequent functions of the scheduler 125 will then seek to make the most appropriate selection and planning determinations.

There is also the potential for jobs that were previously produced, selected, and planned for execution, and possibly even jobs that began execution, to be identified by the produce 126 operation where such jobs are no longer executing and are not identified as completed. This may occur where such jobs are scheduled for execution and terminated prematurely, evicted from execution by a particular computing cloud, or where a third party compute cloud or a local compute cloud goes off-line for scheduled or unscheduled downtime, thus resulting in the previously executing job having an unknown state where it is no longer currently executing and where it also is not marked as completed. Consequently, the workload discovery engine 192 would update the local cache with that particular workload task as requiring scheduling and the produce 126 would consequently create or list a workload task corresponding to the previously scheduled but never completed job.

According to a particular embodiment, there are hundreds of supported workload types capable of being produced, selected, and planned for execution based on their respective priorities, SLT expectations, execution requirements, and current capacity. According to one embodiment, the scheduler will iterate through every possible supported workload type seeking to identify any workloads for each respective type as a group and then produce a list of workloads corresponding to the particular type being evaluated, subsequent to which the scheduler will advance to the next supported workload type and again, via the produce operation, produce a list of all workloads for that particular type, and so on, until every possible supported workload type has been considered. In other embodiments, multiple threads may iterate through every possible supported workload type, albeit, on a per-type by per-type basis, notwithstanding multiple threads executing concurrently.

The defined output of the produce operation 126 is a list of workloads of one specific supported workload type, which require scheduling, selection, and planning for execution. Each listed workload task may additionally be associated with supporting information by the produce operation 126, such as current priority for that task, time since submission or a submission time, expected execution time, SLT expectations, cost constraints or cost budgets for execution of that workload task, preferred third-party compute cloud(s) 199 or local compute cloud preferences, execution requirements such as base image, virtual image, memory, CPU, vCPU(s), software version, and so forth.

Because the various decision points are broken out as individual operations, including the produce 126 phase, the calculate allocation (e.g., capacity) round 128 phase, the select 129 phase, the plan 127 phase, and the optional finalize 131 and analyze 132 phases, each individual operation is highly specialized, extremely fast and efficient, and capable of operating in accordance with simple and straight forward policies.

After the produce phase, the scheduler 125 then proceeds to calculate an allocation route based on the service level targets and capacity that is known to be available at that time (e.g., as represented in the local cache 140 data as maintained by the discovery engine 192). The defined output therefore from the calculate allocation round 128 operation is a determined capacity available for the known list of all possible workload tasks for a given workload type as created by the produce operation 126.

The scheduler 125 then proceeds with the select 129 operation in which the scheduler identifies which of those workload tasks will be picked up for planning against the available capacity. Consider for instance that there are multiple third-party compute clouds 199 presently accessible, some of which are small and have highly restricted capacity whereas others are much larger and may therefore accommodate greater allocations. Additionally, each of the various third-party compute clouds 199 or even local compute clouds or computing pods within a host organization executing the scheduling processing may have different characteristics, such as cost, hardware, software version, etc. The scheduler's 125 select 129 operation identifies which of the available tasks will be picked up for execution given the capabilities to perform the work associated with those tasks in further consideration of the priority and SLTs associated with the identified workload tasks previously produced.

The scheduler's 125 planning 127 operation then proceeds to specifically delineate which task will be performed by which compute cloud from the list of selected workload tasks. For instance, a first priority 1 workload task may be sent to a first third party cloud 199 with other priority 2 tasks being sent to different third-party compute clouds 199 and yet additional tasks having a lower priority being planned for execution by a local computing pod or a local computing cloud of a host organization within which the scheduler 125 operates. Such planning takes into account the policies which may be defined for the workload tasks specifically for the planning 127 phase of the scheduler's 125 processing.

According to certain embodiments, the scheduler 125 then repeats or iteratively applies these calculation 128, selection 129, and planning 127 operations until either the list of produced workload tasks is fully exhausted or the available capacity is fully exhausted. Thus, the scheduler 125 may repeat the processing until all tasks have been planned to satisfaction or all available capacity has been fully exhausted. It is therefore possible that not all tasks will be selected and planned for execution, thus causing them to age in terms of time since submission as well as possibly increase in priority for subsequent scheduling rounds to the extent necessary for the scheduler to ensure that such pending and non-planned workload tasks ultimately are set for execution in accordance with QoS and SLTs associated with the tasks as well as to prevent a starvation condition.

In accordance with another embodiment, some portion of available capacity is left unplanned for produced tasks so as to leave allocation space for possible last minute or late incoming high priority tasks. For instance, the scheduler 125 may iterate through its process operations (e.g., calculating allocation, selecting, planning, etc.) many times, even hundreds of times, so as to plan for execution the tasks for which capacity is available and during this time if high priority tasks arrive, the scheduler 125 may reach the finalize 131 stage at which point it is analyzed whether any high priority tasks remain or have been updated within the local cache 140, and if so, the scheduler may then proceed to allocate those high priority tasks into the portion of available capacity previously left unplanned. In alternative embodiments, the scheduler 125 may additionally or alternatively evict previously planned tasks or even early terminate previously planned and now presently executing tasks so as to schedule high priority late arrival tasks for execution.

According to particular embodiments, the finalize 131 and/or analyze 132 operations are performed separate from and subsequent to the operations performed by the scheduler 125, for instance, being performed by a host organization within which the scheduler 125 operates. In such instances, the separate and distinct finalize 131 and/or analyze 132 operations may override the planning decisions made by the scheduler so as to accommodate or improve upon the execution plan. For instance, such an override may be to replace lower priority tasks with pending higher priority tasks due to such tasks arriving late or not being present within the original produced 126 list of workload tasks, or so as to correct an erroneous or inefficient selection and planning policy instituted by the scheduler 125. In such a way, the scheduler 125 may iteratively process and create a plan of execution with simple policies and decision points, yet remain optimize-able by subsequent finalize 131 and/or analyze 132 operations, regardless of which such functionality resides.

According to a particular embodiment, a simulator is used to estimate changes to computing infrastructure at a local or remote computing pod or third party datacenter accessible via a computing cloud by writing simulated data into the local cache representing additional hardware and computing infrastructure availability via one of the computing resources as well as simulated workload tasks queued for execution. According to such an embodiment, the scheduler may then be utilized to process the simulated data written to the local cache by processing the simulated data written to local cache by iterating through the produce, calculate, select, and plan operations to yield a scheduling plan based on SLTs for the simulated workload tasks and the simulated data representing the additional computing hardware. Such a utility may be utilized to evaluate "what if" scenarios. For instance, to evaluate whether additional computing hardware will sufficiently meet anticipated demand or sufficiently meet actual historical demand. Because the scheduler simply pulls data from the local cache, it is agnostic to the fact that the data in local cache is being provided by a simulator rather than being actual production data.

Figure 1D:
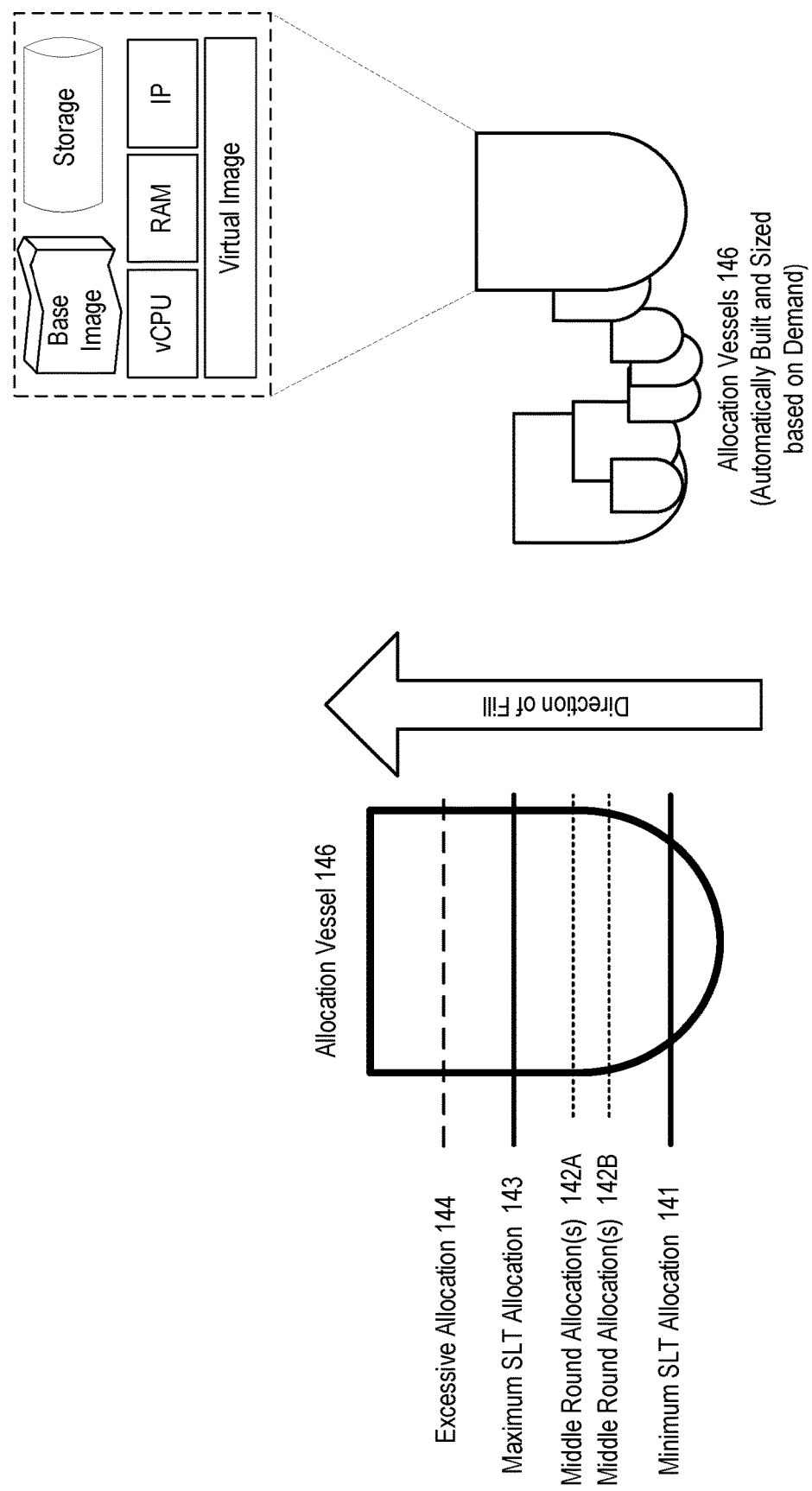
FIG. 1D depicts an exemplary allocation vessel having varying levels of fill in accordance with described embodiments.

FIG. 1D depicts an exemplary allocation vessel 146 having varying levels of fill in accordance with described embodiments.

For instance, as is depicted to the left of the allocation vessel 146, there is a minimum SLT allocation 141, followed by any number of middle round allocations 142A-142B, and then a maximum SLT allocation 143. As is additionally depicted, as the allocation vessel is filled with workload by the scheduler, it is possible to overfill the allocation vessel 146 as is depicted by the excessive allocation 144 level nearest to the top.

Additionally depicted here within the allocation vessels 146 are greater details of each allocation vessel which includes any number of computing resources capable of performing work including, for instance, a base image, storage, CPU allocation or a virtual CPU (vCPU) allocation, RAM, IP or other network address space, and a virtual image. Such allocation vessels 146 are automatically built (e.g., for the base image, etc.) and are sized based on demand by assigning more or less computing resources to any given allocation vessel 146.

Consider for instance each of many compute clouds or computing pods having a allocation vessel 146 representing a set amount of execution capacity for that particular compute cloud or computing pod. Such an allocation vessel 146 may be thought of as a glass of water which begins empty or nearly empty and is then gradually filled with water, where the glass represents the total capacity for a computing cloud and the water represents workload tasks being executed or planned for execution by each respective computing cloud.

Certain glasses or allocation vessels 146 may be full or nearly full (e.g., at or above their maximum SLT allocation 143) and therefore, no additional tasks are allocated whereas other allocation vessels 146 represent compute clouds which have not yet reached their maximum SLT allocation 143, and are therefore "thirsty" for water or capable of receiving additional workload task allocation for execution.

For each compute cloud as represented here by an allocation vessel 146 there may be a minimum and maximum SLT for each workload type. Therefore, the scheduler will seek to provide to every allocation vessel 146 at least a minimum SLT allocation 141 while "pouring" or "filling" the additional available capacity through middle round allocations 142A-142B during iterative processing of the scheduler without surpassing the maximum SLT allocation 143 for any given allocation vessel 146. However, as noted above, some headroom or buffer may be reserved for high priority workload tasks, into which either the scheduler's selection and planning operations or subsequent finalize and/or analyze operations may allocate workload tasks into one or more of the allocation vessels 146 in excess of the maximum SLT allocation 143 threshold, thus resulting in an excessive allocation 144. In certain instances, the excessive allocation 144 may be permitted to remain until the computing cloud completes planned work and thus recedes back below the maximum SLT allocation 143 threshold or alternatively the scheduler or subsequent finalize and/or analyze operations may evict or early terminate some portion of tasks executing within a given allocation vessel 146 to immediately bring that compute cloud back below the maximum SLT allocation 143 threshold so as to affirmatively and immediately eliminate the excessive allocation 144 condition.

According to at least one embodiment, the reserved portion of available compute capacity is set as a percentage of total compute capacity (e.g., such as 10% or 15%) within which the scheduler does not plan selected workload tasks for execution, yet may subsequently during a finalize and/or analyze phase plan tasks for execution, thus consuming the previously reserved portion and consuming the last remaining 10% or 15% of reserved compute capacity. In such a way, the compute clouds may be utilized at maximum efficiency while also permitting late arrival and high priority scheduling for workload tasks which are not selected and planned during normal iterative processing by the scheduler yet meet policy requirements for immediate or special handling during a finalize and/or analyze phase.

FIG. 2A depicts an exemplary scheduling scheme 200 as implemented by the scheduling service in accordance with described embodiments.

According to an exemplary embodiment, the scheduler (e.g., scheduler 125 from FIGS. 1A-1C) is responsible for allocating two distinct types of workloads, such as group A 202 workloads identifying the boxes having the thick black border and group B 203 workloads identifying the boxes having the thin black border.

In the simplest example, there is depicted at the local view 210 compute resources provided by cloud A 205, such as computing architecture available within the host organization hosting the scheduling service or a particular cloud-based service platform provided by a third party and accessible to the scheduling service, regardless of whether the scheduling service operates within a host organization or as a stand-alone scheduling service.

Notably, there are no tasks presently running within cloud A 205.

During the produce 215 operation, the scheduler creates create three group A 202 tasks of a first workload type in which there is one priority 1 task, one priority 2 task, and one priority 3 task. During the same produce 215 operation, the scheduler additionally creates four group B 203 tasks of a second type, in which there is one priority 1 task, one priority 2 task, one priority 3 task, and one priority 4 task.

All of the tasks are created by the scheduler with consideration of the pending workload presently enqueued and awaiting start of work as well as all tasks that are actually in progress at that time.

Because the information is stored within and served up by a local cache the access to such information is extremely fast, thus permitting the scheduler to cycle through the process multiple times per minute.

Continuing with the above example, transitioning to the calculate round 220 operation having a P1 status (priority 1 status), the scheduler calculates the first allocation round and determines that the group A 202 tasks require a much larger allocation, thus permitting multiple large tasks of equal size while allocating a much smaller collection of resources to the group B 203 tasks. As depicted, the large box with the thick black border at operation 220 indicates a larger resource allocation whereas the smaller box with the thin black border at operation 220 indicates a smaller allocation of resources. Therefore, during the first calculate round 220 the scheduler gives group A 202 a larger resource allocation, allowing for almost four workload tasks of equal size, whereas the group B 203 tasks receive a smaller allocation.

Moving to the select 225 operation, because there are priority 1 tasks in both groups, the select operation 225 selects the one priority 1 task from group A 202 and selects the one priority 1 task from group B 203. The select operation 225 additionally selects the one priority 2 task from group A. The remaining tasks from groups A and B 202-203 are not selected.

At the planning 230 operation there are only sufficient resources within cloud A 235 for two tasks and consequently, there is one group B 203 task planned for work via the available cloud A 235 and there is one group A 202 task to be planned for work via the same cloud A 235. The selected group A 202 priority 2 task is not planned for execution at this time via cloud A 235.

The cloud A 235 provides available resources to perform work, but it is not necessarily owned or controlled by the host organization operating the scheduler 125 and in the case of a stand-alone scheduler architecture, the clouds by definition must be third-party cloud-based resources capable of performing work on demand. Exemplary clouds capable of performing such work include private clouds such as OpenStack and VMWare as well as public clouds such as AWS and Azure.

Figure 2B:
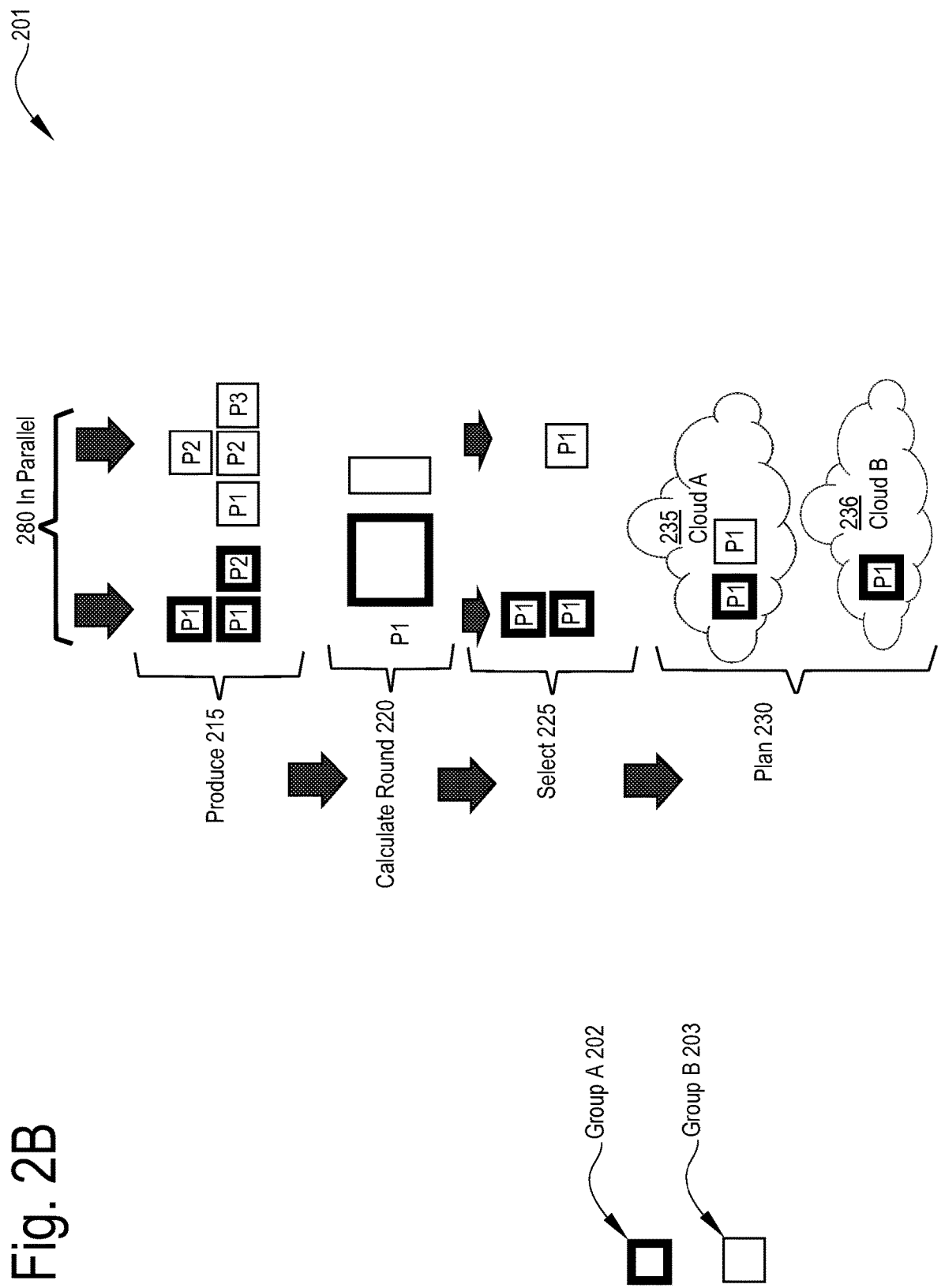
FIG. 2B depicts another exemplary scheduling scheme as implemented by the scheduling service in accordance with described embodiments.

FIG. 2B depicts another exemplary scheduling scheme 201 as implemented by the scheduling service in accordance with described embodiments.

As depicted here, both workload types from group A 202 and also group B 203 are allocated by the scheduler in parallel 280.

During the produce 215 operation, the scheduler creates create three group A 202 tasks of a first workload type in which there are two priority 1 tasks and one priority 2 task. During the same produce 215 operation, the scheduler additionally creates four group B 203 tasks of a second type, in which there is one priority 1 task, two priority 2 tasks, and one priority 3 task. As before, the tasks are created by the scheduler with consideration of enqueued and waiting workload as well as tasks that are actually in progress.

Transitioning to the calculate round 220 operation having a P1 status (priority 1 status), the scheduler calculates the first allocation round and determines that the group A 202 tasks require a larger allocation, thus permitting approximately four large tasks of equal size while allocating a much smaller collection of resources to the group B 203 tasks.

Moving to the select 225 operation, because there are priority 1 tasks in both groups, the select operation 225 selects the two priority 1 tasks of group A 202 and selects the one priority 1 task of group B 203.

At the planning 230 operation there are only sufficient resources within cloud A 235 for two tasks and consequently, there is one group B 203 task planned for work via the available cloud A 235 and there is one group A 202 task planned for work via the same cloud A 235.

Additional resources are required to plan the remaining priority 1 task from group A 202 and consequently, the last remaining priority 1 task from group A 202 is planned for execution via a separate computing resource pool provided by cloud B 236, thus completing the plan 230 phase. The remaining tasks from groups A and B 202-203 were not selected and are not planned for execution via either cloud A 235 or cloud B 236 at this time.

Subsequent to the P1 priority status first calculation round 220 operation, the scheduler will repeat processing until either all available resources are exhausted or until all produced tasks are exhausted.

Therefore, in a subsequent calculation round (not shown) the scheduler will reduce the priority to 2 given that all priority 1 tasks are already planned. Because all priority 1 tasks have been planned there only remains sufficient processing resources for two additional tasks. Therefore, each of group A 202 and group B 203 include one priority 2 task selected and planned for execution. The selected tasks are allocated to cloud B 236 as it is the only cloud with remaining compute resources available.

After this second P2 calculate round, all of the group A 202 workload tasks have been selected and planned in a prior round whereas group B 203 has tasks remaining which have yet to be selected and planned, with group B 203 specifically having one priority 2 task remaining and one priority 3 task remaining.

During the next calculate round it is determined by the scheduler that no compute resources remain and thus the scheduler ends the cycle, despite the fact that some workload tasks from group B 203 remain yet to be selected or planned for execution.

According to one embodiment, the scheduler next runs the optional finalize operation and recognizes that group B 203 has outstanding tasks that are not yet planned for execution. Because group B 203 is a lower priority workload type according to this example, the finalize operation takes no further action and does not age any workloads given that compute resources were allocated to group B 203 during the scheduling process, albeit not sufficient resources to process all of group B 203 tasks pending.

Because there are many different reasons to create tasks, there will be multiple producer policies for creating tasks via the produce 215 operation, such as the creation of tasks to build artifacts whereas another type of workload may create a task for executing tests, and each will likely have a different priority. Similarly, the remaining operations of the scheduler including the selection 225 and planning 230 phases will likewise benefit from having simple and well-defined operations which, when taken together, operate as a sophisticated scheduler service.

Specifically depicted here are multiple computing resources or multiple pools of computing resources, such as the cloud A 235 and cloud B 236, into which the scheduler may produce, calculate capacity, select, and plan execution of workload tasks concurrently in parallel 280. It is very likely that there are many varying types of computing resources accessible to the scheduler for assigning workload tasks to be performed, be they local or remote computing pods within a local or a remote host organization or public and private third-party computing clouds accessible to the scheduler.

Moreover, there may be a very wide variation amongst the various computing clouds 235 or computing resources accessible to the scheduler, such as the quantity of RAM, CPUs, vCPUs, pricing, software versions, base images, operating systems, patch levels, peripherals, licenses, and so forth. Moreover, the differences amongst the computing resources affect the amount of time that any given workload task may take to complete based on the above characteristics of such computing resources.

The scheduler therefore may take such information into account when calculating capacity and allocating selected workload tasks into the available calculated capacity by modeling the expected performance of allocated tasks at the variously available computing clouds 235 and 236, so as to generate an expected plan of execution for the workload tasks. In such a way, the scheduler may then allocate workload tasks in accordance with QoS or SLT provisions specifying, for instance, permissible timing for completion of a task. Other policy, QoS, or SLT considerations which may be evaluated by the scheduler include seasonal or periodic demand such as work that is high priority during the day or during working hours but low priority when executed on a weekend or vise versa.

The scheduler may iteratively perform the producing, calculating, selecting, and planning operations so as to gradually fill the available capacity of the various computing clouds to a maximum permissible capacity.

According to a particular embodiment, as the scheduler gradually fills the variously available computing clouds to capacity, the scheduler estimates time to completion for the workload tasks planned for execution based on a histogram providing a distribution of workload tasks assigned to the various computing resources. The scheduler may select a workload task for execution and assign the selected task to a particular computing resource based on which of the available resources will complete the assigned workload task within an SLT required time limit based on the histogram. In such a scheme, the scheduler may not necessary assign a selected workload task to a fastest or best performing computing resource, but rather, select one of the computing resources which is fast enough, based on QoS or SLT requirements.

In such a way, the scheduler models a forward looking view when creating a plan 230 to determine whether everything scheduled will complete within an acceptable time period. Where selected workload tasks cannot meet the requirements based on available capacity at the computing resources the scheduler may need to evict previously scheduled workloads, terminate currently executing workloads, or re-enqueue the workload task with a higher priority such that it is scheduled with greater preference during a subsequent scheduling cycle.

Certain tasks may initially be queued with a very low priority and therefore reside within a list produced 215 for a long period of time without ever being selected. For instance, if a workload task must execute every 12 hours, then during the first hour, the workload task may have such a low priority that it is never selected and planned for execution by the scheduler. However, the identical task will increase in urgency over time due to aging as the target completion time nears closer. If the workload takes 30 minutes to complete on a typical computing resource then by the sixth hour the same task may have a medium priority and by the 11th hour the same task may be increased to a critical priority, thus causing the same scheduler to evaluate the same task differently. A workload discovery engine may therefore monitor such workload tasks queued for execution and update a local cache with the presence of such a workload task as well as the priority and aging of such work in accordance with QoS or SLT requirements.

Because the scheduler executes in an iterative fashion, the schedulers produce 215, calculate 220, select 225, and plan 230 operations will continuously re-assess queued workload tasks which have not yet been scheduled for execution or have not completed execution and thus, as the priority or age or SLT/QoS requirements associated with such a task change over time as represented by the local cache, the scheduler will respond to these changes when it pulls information for a next scheduling iteration from the local cache, regardless of what may have occurred in the past for any given workload task. Even where workload tasks are re-enqueued due to having failed, been terminated, evicted, or simply timed-out, the scheduler will simply treat the re-enqueued workload tasks based on their currently available information as represented by the local cache. A workload discovery engine may therefore recover from a failed or terminated workload task by updating the local cache to indicate the workload task requires execution as well as possibly indicating a heightened priority or a greater age for the task.

Should the entire scheduling service terminate and be re-instantiated, the workload discovery engine will update the local cache with all pending workload tasks yet to be scheduled, all presently executing workload tasks from known and currently accessible computing resources, and all completed tasks previously assigned to a computing resource. In such a way, it is not necessary for the scheduling service to persistently maintain state information as such state information may be dynamically re-built ad-hoc as needed, including associated priority information, aging information, and so forth. Such information may be discovered by the workload discovery engine from, for example, a continuous integration cloud listing work to be completed or from other work queues or sources accessible to the workload discovery engine.

FIG. 3 depicts another exemplary scheduling scheme 300 as implemented by the scheduling service in accordance with described embodiments.

Following from the tasks depicted at FIGS. 2A and 2B, there are now depicted at FIG. 3 one priority 1 task from each of group A 302 and group B 303 presently executing via cloud A 335 as shown within the local view 310.

In a subsequent scheduling round, because cloud A 335 already includes the priority 1 tasks from groups A and B 302-303 the scheduler will produce a different set of tasks at produce operation 315, thus resulting in group A 302 having only two workload tasks, one priority 2 task and one priority 3 task and group B 303 having three workload tasks, one priority 2 task, one priority 3 task, and one priority 4 task.

As described above, certain tasks may not be selected or scheduled once the available compute resources are fully exhausted, even where there remains tasks to be scheduled.

However, consider that a new compute cloud is discovered by the workload discover component or alternatively, a previously known but unavailable compute cloud becomes available after freeing up resources or after finishing scheduled maintenance or after unexpectedly being unavailable or inaccessible.

Because the compute resource discovery component and the workload discovery component monitors the availability and completed or executing tasks at the variously available compute clouds the local cache will be updated by such monitoring services and the scheduler can then make new and more up to date determinations as to what tasks are to be selected and planned for execution.

Even if the local cache has been flushed or overwritten, the monitoring services will update and maintain the local cache with the new information reflecting that a second compute cloud has now come back on-line or is for whatever reason, available again despite being previously unavailable.

The following figure depicts the scheduler accounting for such a change via its iterative processing.

FIG. 4 depicts another exemplary scheduling scheme 400 as implemented by the scheduling service in accordance with described embodiments.

As depicted via local view 410, there is now a new compute cloud accessible and available to the scheduling service. Specifically, there remains cloud A 435 which was previously available, however, there is now additionally depicted cloud B 440 which was previously unavailable or inaccessible. For instance, cloud B 440 may be re-discovered by the monitoring components such as the compute resource discovery component at element 115 from FIG. 1B after a maintenance window or other period where the services are unavailable.

As shown here, there is a priority 2 task from group A 402 and a priority 3 task from group B 403 presently executing within cloud B 440 which are updated to the local cache after re-discovery of the cloud B 440 and after the workload discovery operation which queries for any running and completed tasks.

Here the produce 415 operation immediately recognizes that the priority 2 task from group A 402 and the priority 3 task from group B 403 are executing within the cloud B 440 and therefore, the produce operation 415 generates only a single remaining priority 3 task from group A 402 and the priority 2 and priority 4 tasks from group B 403 which remain yet to be selected and planned for execution.

In such a way, even unscheduled or unexpected downtime does not disrupt the scheduler which simply accommodates the new information by the eventual consistency design and thus permitting for a highly decoupled scheduler implementation from the various computing clouds.

Whereas FIG. 3 depicts the allocation of workload tasks into only a single cloud FIG. 4 depicts the allocation of workload tasks into multiple compute clouds, specifically cloud A 435 and cloud B 440. Based on the capacity of each cloud certain amount of workload is computed and then pending workload tasks produced and selected by the scheduler are planned for execution via the computed capacity of each cloud. During each heartbeat or iteration of the scheduler's compute, selection, and planning phases, additional workload tasks are planned for execution within the available capacity of the respective compute clouds 435 and 440 until all tasks produced have been exhausted or until all calculated capacity of the respective compute clouds is consumed.

However, according to the described embodiments, the scheduler adapts to any scheduled or unscheduled downtime exhibited by any compute cloud. For instance, consider that at FIG. 3 there were two compute clouds into which capacity was calculated and workload tasks were executing or being planned for execution, yet the second compute cloud B 440 as depicted here became unavailable or became out of contact with the scheduler. In such a situation, the scheduler will continue to compute, select, and plan for execution workload tasks within the cloud A which remains available (e.g., cloud A 335 at FIG. 3) and those tasks which were executing at cloud B but not completed will therefore re-appear on the produce list created by the scheduler and therefore be subject to selection and planning by the scheduler within the remaining available computing cloud (e.g., cloud A 335 at FIG. 3).

When the second computing cloud again becomes available as is depicted by cloud B 440 at FIG. 4, the executing workload tasks 2 and 3 within the second computing cloud B 440 do not need to be re-selected or re-planned for execution, but rather, a workload discovery engine of the scheduler will discover that cloud B 440 is again available, updating the local cache with the availability of such a compute cloud, and the workload discovery engine will additionally identify those tasks completed by cloud B 440 as well as those tasks executing within cloud B 440. In the event that tasks on a produce list are not also shown executing within cloud B 440 which becomes available again after a scheduled or unscheduled period of inaccessibility, the executing tasks at cloud B 440 will simply be stripped from the produce list of the scheduler (e.g., by the workload discovery engine updating the local cache based on query response(s) from the compute cloud B 440) such that those executing and not yet completed tasks are no longer subject to the selection and planning operations by the scheduler.

Similarly, entire scheduler mechanism is likewise resilient to planned or unplanned outages which causes a partial or total loss of status of pending or completed workload tasks or a partial or total loss of communication with any of the local or third-party compute clouds. Because the information utilized by the scheduler is entirely based on data stored within the local cache which is maintained by the auxiliary services of the scheduler such as the compute resource discovery mechanism (e.g., element 115 of FIG. 1) and the workload discovery mechanism (e.g., element 135 of FIG. 1), it is therefore possible for the scheduler to encounter a total loss of state data or a total expected or unexpected shutdown and yet recover seamlessly as the discovery engines supporting the scheduler will independently identify any possible compute clouds capable of performing work (e.g., via the compute resource discovery engine), independently identify work to be performed (e.g., via a continuous integration cloud), independently identify executing and completed work (e.g., via the workload discovery engine), each of which update the local cache, from which the scheduler will then have all requisite data to continue producing workload tasks requiring execution, selecting those tasks, and planning those tasks for execution, regardless of any prior shutdown or loss of state data.

For example, even where the scheduler loses connectivity with both cloud A 435 and cloud B 440, once the scheduler resumes connectivity with the compute clouds, the discovery engines will update the local cache with the relevant data and the scheduler may then proceed forward as if connectivity had never been lost. Specifically, the scheduler need not re-schedule the tasks presently executing by the compute clouds as such work will be re-discovered as either having completed or remaining executing and therefore such workload tasks will be stripped or pruned from any production list of workload tasks yet to be planned.

Where such tasks are re-discovered as either having been completed or remaining executing, the tasks are effectively dropped from the scheduler due to their removal from the produce operation which provides as input to the scheduler all pending workload tasks for a given workload type yet to be scheduled.

FIG. 5A depicts another exemplary scheduling scheme 500 as implemented by the scheduling service in accordance with described embodiments.

In accordance with certain embodiments, there is an optional finalize 530 operation which is performed after the completion of all rounds of allocation to capacity for available resources. Such a finalize 530 operation provides analysis of the set of tasks produced, selected, and planned.

As shown here, there is a priority 1 task from group A 502 and a priority 3 task from group B 503 presently executing within cloud 505 as may be observed within the local view 510.

According to such an embodiment, the produce 515 operation of a subsequent round of scheduling (e.g., after the round that selected and planned the now executing tasks at cloud A 505) creates three tasks from group A 502 including two priority 1 tasks and a single priority 2 task. For group B 503 the produce 515 operation creates four tasks including a single priority 1 task, two priority 2 tasks, and a single priority 3 task.

The depicted cloud A 505 has room only for two tasks, and is presently executing two tasks, a priority 1 and a priority 3 task.

At the calculate round 520 the scheduler recognizes that there is no remaining capacity available via cloud A 505 to be allocated to any task and therefore, despite having produced three group A 502 tasks and four group B 503 tasks, many of which are of higher priority than the presently executing priority 3 task, the calculate round 520 causes the scheduler to complete empty 581 without selecting or planning any further tasks for execution due to having already exhausted all available compute resources.

However, at the optional finalize 530 operation, the scheduler recognizes that a high priority 1 task remains within each of groups A and B 503-504 which has yet to be selected and planned for execution whereas a much lower priority 3 task from group B 503 is currently executing.

Consequently, the scheduler via the finalize 530 processing operation will affirmatively move to evict the lower priority 3 task from group B 503 from executing at cloud A 505, thus causing an early termination 506 and non-completion of the lower priority 3 task from group B 503.

Because the scheduler operates with discrete and segregated functions it is possible to re-evaluate previously scheduled jobs, even those previously selected and planned for execution.

At some point, no matter how good any scheduler or scheduling algorithm may be, there will be mistakes which need correcting, such as a higher priority job being left unscheduled while lower priority work is selected and planned for execution.

So as to fully utilize available computational resources to their fullest and in the most efficient manner possible, the scheduler provides the further capability of post-selection and post-planning review in a process referred to herein as "finalizing" or "analyzing." During such finalize and/or analyze operations the scheduler will re-evaluate prior decision making implemented by other functional components, such as the preceding selection and planning phases.

Consider for instance work that is planned for execution on a remote third party computing cloud while resources remain free and available internal to the host organization. Because the internally available resources represent a fixed capital cost, they are essentially free or nearly free to utilize (e.g., ignoring the marginal increase in electricity costs). It may therefore be preferable to kill or terminate planned work, even currently executing work, which is running on a third party computing cloud in favor of scheduling and performing such work on the locally available computing resources within the host organization's computing infrastructure.

It is therefore in accordance with described embodiments that planned workloads presently executing on a third party cloud may be terminated prematurely, before they finish, and re-scheduled for execution within available capacity of the host organization.

In other embodiments, the finalize operation may re-evaluate scheduled work and identify a lower priority job executing within a computing cloud that may be evicted from its allocated computing capacity space at a local or remote computing cloud on the basis that, for example, the work is of a lower priority than pending higher priority work and further on the basis that the work may be canceled and re-scheduled at a later time and still finish within an expected SLT target time frame.

According to such an embodiment, the scheduler will optimistically plan the higher priority workload for execution within computing capacity presently allocated and being utilized by a currently executing workload and then immediately terminate and evict the currently running workload and initiate execution of the higher priority workload in its place.

Such a situation may occur because during the produce stage there are two higher priority jobs which must be selected and planned for execution as depicted here, along with the lower priority P2 and P3 jobs. However, because the lower priority P3 was already executing within the computing cloud A 505, only one of the two high priority P1 jobs is selected and planned for execution, thus leaving the other high priority P1 job behind and yet to be scheduled.

If there is insufficient capacity remaining to schedule, plan, and execute the last remaining high priority job then the job will be passed over and remain queued as depicted by calculate round 520 for which the remaining available capacity is empty 581.

Regardless, during the analyze stage, functionality recognizes that there remains another high priority P1 job yet to be selected and planned while the lower priority P3 job remains executing. Consequently, the analyze stage functionality will pre-maturely terminate the lower priority P3 job, thus evicting the lower priority P3 job from its allocated computational space within compute cloud A 505, and thus freeing compute capacity into which the higher priority P1 job may then be planned for execution.

With room now available or one more high priority P1 job to execute within the compute cloud A 505, the scheduler's analyze stage will select and plan the P1 job and initialize execution of the P1 job within the compute cloud A 505 within the space previously utilized by the evicted P3 job.

Because the lower priority P3 job was killed without successful completion, the P3 job will be returned to the produce queue where a subsequent iteration of the scheduler will produce a list of pending workload jobs to be scheduled, within which the terminated P3 job will be ready for selection and planning operations.

According to certain embodiments, the scheduler's analyze stage replaces or swaps the higher priority P1 job with the lower priority P3 job evicted from the compute cloud A 505. In alternative embodiments, the lower priority P3 job is re-queued within local cache and the higher priority P1 job remains queued within local cache and a subsequent iteration of the scheduling service then produces all workload jobs of a given type to be scheduled for execution thus identifying both the re-queued lower priority P3 job and also the higher priority P1 job. With the complete list of all workloads of a given type having been produced, the produced list of jobs is then provided as input to the scheduler in the manner described above, from which the calculate, select, and plan operations proceed as discussed above (refer to the calculate 128, select 129, and plan 127 operations at FIG. 1C) within which the higher priority P1 job will be selected and planned for execution within the space freed up via the eviction of the lower priority P3 job.

The terminated job will be one for which the system's scheduling service has a high degree of confidence that despite being terminated, may be re-scheduled at a later time and still finish within a time frame set by the SLT for the terminated job. In such a way, it is possible that the same job may be scheduled, terminated, re-queued, re-scheduled, and terminated again, multiple times, before eventually moving up the queue in terms of priority or urgency such that it is eventually scheduled and executed through to completion without further interruption. Moreover, each time a job is terminated prematurely its remaining window of time within which it may successfully execute to completion in compliance with its SLT timeframe is reduced, and therefore, such terminated jobs will organically become increasingly urgent and increase in priority until such time that the job may be scheduled and execute to completion.

The following figure demonstrates the new allocation of the higher priority P1 task subsequent to the analyze stage functionality having freed up resources within the cloud A 505 due to the early termination 506 of the group B 503 priority 3 task.

Figure 5B:
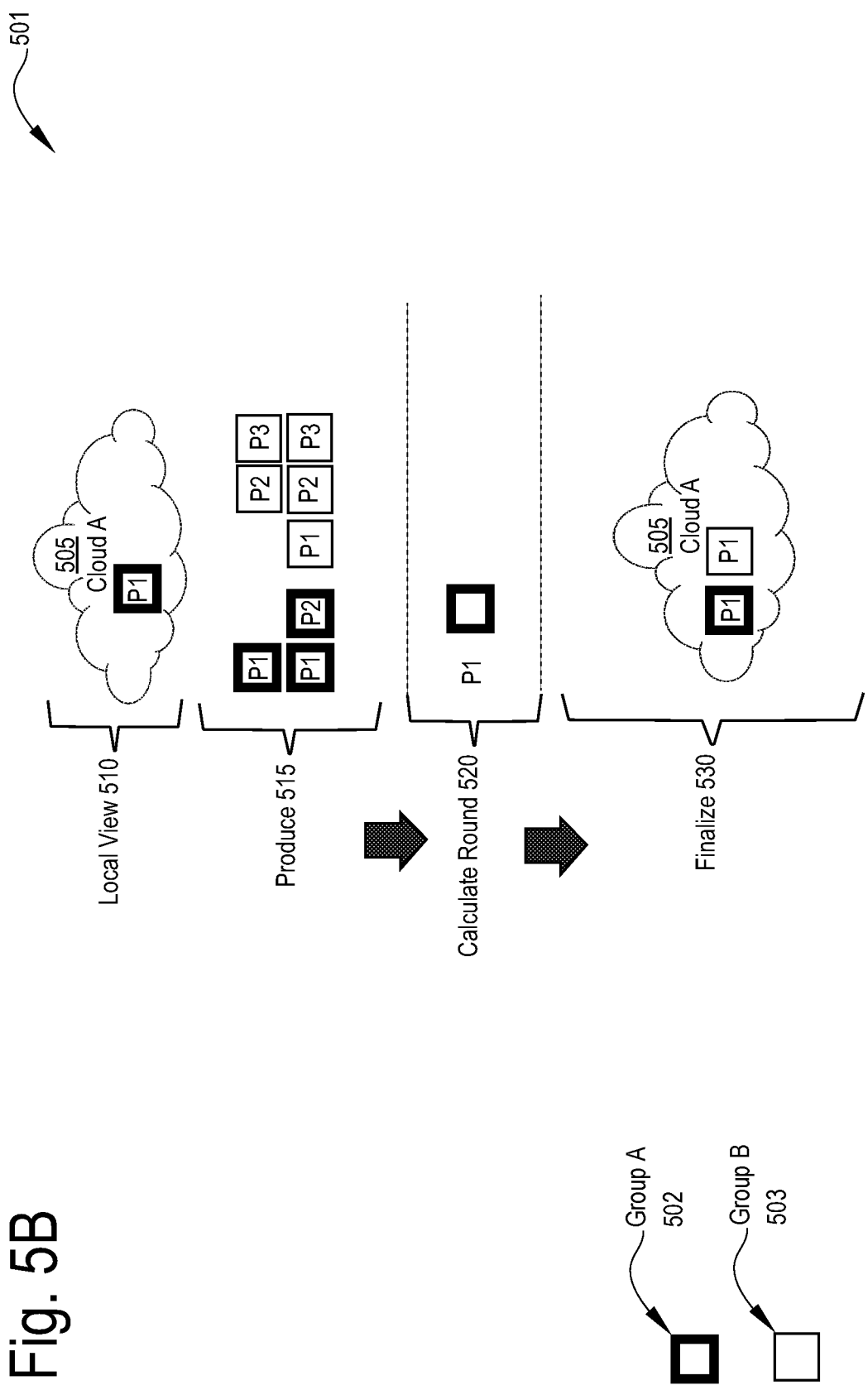
FIG. 5B depicts another exemplary scheduling scheme as implemented by the scheduling service in accordance with described embodiments.

FIG. 5B depicts another exemplary scheduling scheme 501 as implemented by the scheduling service in accordance with described embodiments.

As depicted here by local view 510, the cloud A 505 now has only a single priority 1 task from group A 502 presently executing as a consequence of the early termination 506 of the group B 503 priority 3 task as depicted at FIG. 5A.

The produce 515 operation generates three group A tasks as before but now generates five group B tasks, including the recently terminated 506 group B task 503 priority 3 task evicted by the scheduler during the finalize 530 operation.

The calculate round 520 now recognizes that compute resources are available via cloud A 505 which has a single resource space remaining and consequently selects and plans for execution the priority 1 task of group A 502 resulting in the priority 1 task of group A taking the place of the previously executing lower priority 3 task from group B.

In such a way, the finalize 530 operation institutes a policy that checks for more important high priority tasks which were produced but not planned and then seeks to reclaim lower priority tasks presently executing and thus consuming compute resource space. During a next scheduling round, the higher priority tasks are then planned as result of capacity opening up. Considering the scheduler is likely running at high utilization levels of its resources, there are likely to be lower priority tasks that may have already started before the scheduler has an opportunity to select and plan the higher priority task.

By calculating required capacity in the optional finalize 530 operation and then identifying all tasks which have been started opportunistically, the scheduler may determine it is favorable to evict or terminate such tasks early based on their remaining time, priority, workload type, and/or SLTs, so as to make room for and schedule higher priority tasks which will then preempt the lower priority tasks within the available compute resources, such as those provided by cloud A 505 as depicted here.

The scheduler will make its determination as to which tasks may be removed based on whether or not the evicted tasks may be started later and still meet their applicable SLT, essentially resulting in no Quality of Service loss due to the preemption.

Figure 6:
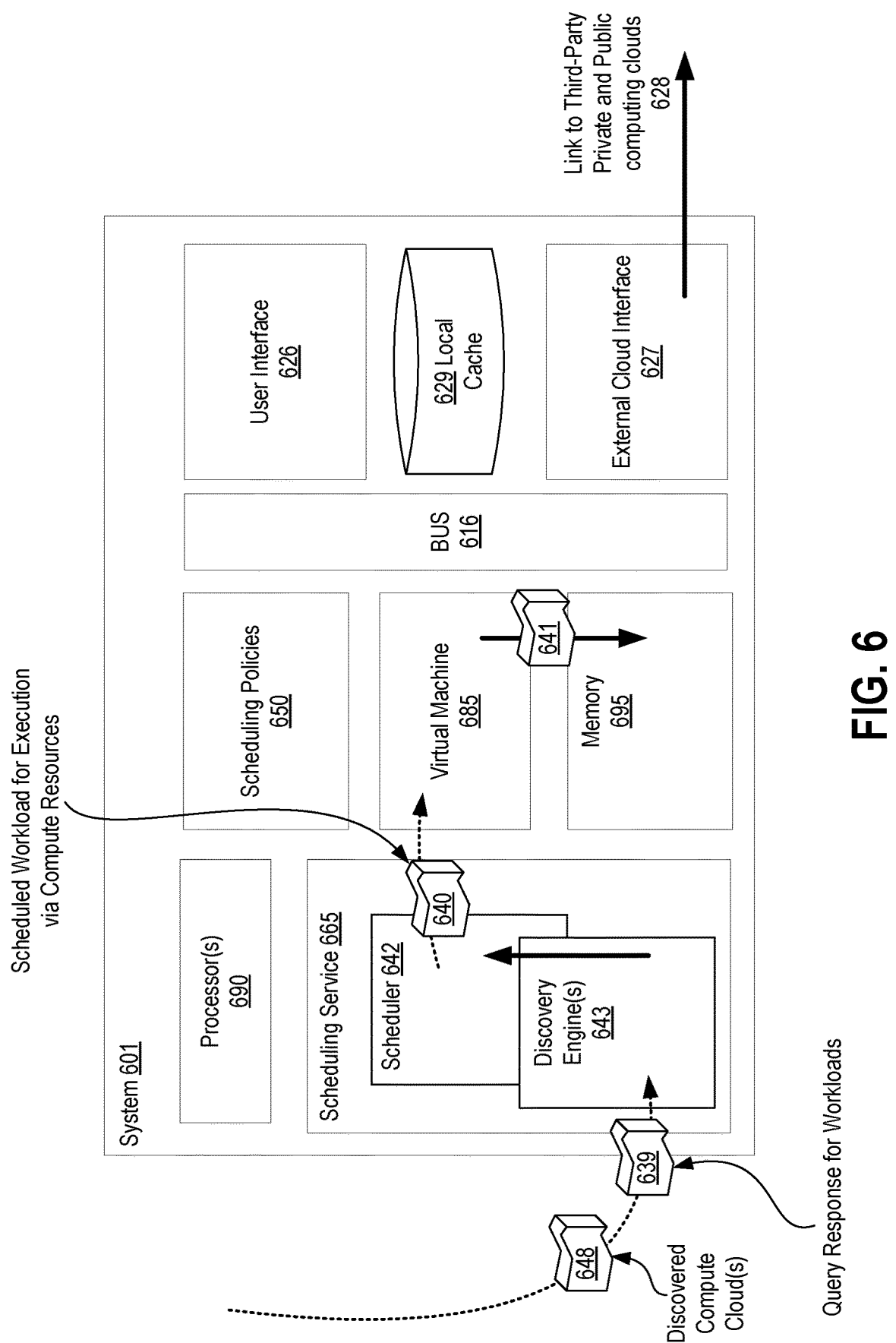
FIG. 6 shows a diagrammatic representation of a system within which embodiments may operate, be installed, integrated, or configured, in accordance with described embodiments.

FIG. 6 shows a diagrammatic representation of a system 601 within which embodiments may operate, be installed, integrated, or configured.

According to the depicted embodiment, the system 601, which may operate within a host organization, includes the processor 690 and the memory 695 to execute instructions at the system 601. According to such an embodiment, the system 601 further includes: a scheduling service 665 which includes discovery engine(s) 643 to receive query responses for workloads executing at compute clouds specifying completed and executing work as well as discovery of the compute clouds 648 themselves which are capable of performing work on behalf of the scheduling service. Further included within scheduling service 665 is scheduler 642 which selects and plans workloads tasks 640 for execution via available compute resources pursuant to the scheduling policies 650. For instance, as depicted here there is a virtual machine 685 having mapped computing resources such as vCPU, RAM, a base image, a virtual image, IP space and network links, etc. The virtual machine 685 executes the workload tasks 641 in conjunction with memory 695.

According to another embodiment of the system 601, a user interface 626 operates at a user client device remote from the system and communicatively interfaces with the system via a public Internet and the external cloud interface 627 provides a communications link to third party private and public computing clouds 628 on behalf of the scheduling service 665.

Such a system may reside within a host organization which operates as a cloud-based service provider to the user client device; in which the cloud-based service receives inputs from the client device at the user interface 626 to configure use of the scheduling service 665 and identify workload tasks to be performed on behalf of the user device or on behalf of a customer organization, developer, business customer, or another user.

In accordance with one embodiment of the system 601, the system implements a scheduling service 665, in which the system includes: a processor 690 and a memory 695 to execute instructions at the system 601; a compute resource discovery engine 643 to identify one or more computing resources such as a private or public computing cloud 628, in which the computing resources are available to execute workload tasks 640; a workload discovery engine 643 to identify a plurality of workload tasks 640 to be scheduled for execution responsive to queries 639 by the workload discovery engine; a local cache 629 to store information on behalf of the compute resource discovery engine 643 and the workload discovery engine 643; a scheduler 642 to request information from the local cache 629 specifying the one or more computing resources available 628 to execute workload tasks and the plurality of workload tasks 640 to be scheduled for execution; and further in which the scheduler is to schedule at least a portion of the plurality of workload tasks 640 for execution via the one or more computing resources 628 based on the information requested Bus 616 interfaces the various components of the system 601 amongst each other, with any other peripheral(s) of the system 601, and with external components such as external network elements, other machines, client devices, cloud computing services, etc. Communications may further include communicating with external devices via a network interface over a LAN, WAN, or the public Internet.

According to another embodiment of the system 601, the scheduler is to further perform at least the following operations: producing a list of the workload tasks to be executed based on the information requested from the local cache; computing available capacity to execute workload tasks at each of the one or more computing resources based on the information requested from the local cache; selecting the portion of the plurality of workload tasks for execution via the one or more computing resources based on the information requested; and planning execution of the selected workload tasks by scheduling the selected portion of the plurality of workload tasks with the one or more computing resources based on the computed available capacity to execute workload tasks at each of the one or more computing resources.

According to another embodiment of the system 601, the scheduler is to further perform additional operations, including: initiating execution of the selected workload tasks at the one or more computing resources pursuant to the planned execution; and removing any selected and planned workload tasks from the list of the workload tasks to be executed.

According to another embodiment of the system 601, the scheduler is to further initiate execution of the selected workload tasks at the one or more computing resources pursuant to the planned execution; and in which the workload discovery engine is to further: (i) determine the selected and planned workload tasks are executing at the one or more computing resources, and (ii) update the local cache to indicate the selected and planned workload tasks are executing at the one or more computing resources; and in which producing the list of the workload tasks to be executed based on the information requested from the local cache includes producing an updated list of the workload tasks during a subsequent processing cycle of the scheduler based on the updated information in the local cache including the indication that the selected and planned workload tasks are executing at the one or more computing resources; and in which the updated list does not include the selected and planned workload tasks indicated by the local cache as executing at the one or more computing resources.

According to another embodiment of the system 601, the scheduler is to further perform additional operations, including: discovering, via the workload discovery engine, that a workload task selected and scheduled for execution via any one of the computing resources has failed, terminated prematurely, failed to complete successfully within a threshold period of time, failed to complete successfully within a time specified by a Service Level Target (SLT) for the workload task, or is no longer executing at any of the one or more computing resources available to execute workload tasks or marked as complete by the computing resources to which it was assigned for execution; updating the local cache to indicate the workload task is to be re-scheduled for execution; and aging or increasing a priority designation within the local cache for the workload task to be re-scheduled for execution.

According to another embodiment of the system 601, the scheduler is to iteratively repeat the producing, computing, selecting, and planning operations until either (i) all of the plurality of workload tasks identified for execution via the one or more computing resources have been planned for execution or (ii) all of the computed available capacity to execute the workload tasks at each of the one or more computing resources has been exhausted.

According to another embodiment of the system 601, the local cache includes an asynchronous local cache; in which the compute resource discovery engine and the workload discovery engine each update the information within the asynchronous local cache independent of the scheduler; and in which the scheduler requests information from the asynchronous local cache independent of the compute resource discovery engine and the workload discovery engine.

According to another embodiment of the system 601, the compute resource discovery engine is to further: query any discovered computing resource to determine any workload tasks presently executing by each respective discovered computing resource which was assigned to the discovered computing resource by the scheduler; query any discovered computing resource available to execute workload tasks to determine any completed workload tasks which were assigned to the discovered computing resource by the scheduler; and update the local cache with results received responsive to the queries.

According to another embodiment of the system 601, the compute resource discovery engine is to re-discover a previously known computing resource having one or more workload tasks assigned for execution by the scheduler; and in which the re-discovered previously known computing resource was removed from the local cache by the compute resource discovery engine due to planned or unplanned inaccessibility to the scheduler.

According to another embodiment of the system 601, the compute resource discovery engine is to further: update the local cache to list the re-discovered previously known computing resource as one of the computing resources available to execute workload tasks; query the re-discovered previously known computing resource to determine any workload tasks presently executing which were assigned to the discovered computing resource by the scheduler; query the re-discovered previously known computing resource to determine any completed workload tasks which were assigned to the discovered computing resource by the scheduler; and update the local cache with results received responsive to the queries.

According to another embodiment of the system 601, the stateless scheduler service does not persistently maintain state of the one or more computing resources identified as available to execute workload tasks between instances of execution of the scheduling service and in which the stateless scheduler service does not persistently maintain state of the plurality of workload tasks to be scheduled for execution or scheduled for execution between instances of execution of the scheduling service; in which the stateless scheduler service upon instantiation of a new execution instance re-builds current state information by: (i) re-discovering, via the compute resource discovery engine, all computing resources available to execute workload tasks; (ii) re-discovering, via the workload discovery engine, all workload tasks to be scheduled for execution; (iii) re-discovering, via the workload discovery engine, all workload tasks currently executing via any of the computing resources which were assigned to the computing resources by the stateless scheduling service; (iv) re-discovering, via the workload discovery engine, any completed workload tasks finished executing via any of the computing resources which were assigned to the computing resources by the stateless scheduling service; and (v) updating the local cache with the state of the re-discovered computing resources and the state of the workload tasks to be scheduled for execution or currently executing or completed executing via the computing resources.

According to another embodiment of the system 601, the scheduler is to further produce a list of all workload tasks to be executed based on the information requested from the local cache; in which the produced list of all workload task identifies a priority for each of the workload tasks to be executed.

According to another embodiment of the system 601, the scheduler is to further receive as input a list of all workload tasks to be executed based on the information stored within the local cache; and in which the scheduler is to further select a portion of workload tasks for execution via the one or more computing resources based one or more of: a priority associated with each of the workload tasks as specified via the list; a Quality of Service (QoS) designation for each of the workload tasks as specified via the list; and a Service Level Target (SLT) associated with each of the workload tasks as specified via the list.

According to another embodiment of the system 601, the scheduler supports a plurality of distinct workload types; and in which the workload discovery engine to identify the plurality of workload tasks to be scheduled for execution includes the workload discovery engine to identify a first group of workload tasks of a first type during a first scheduling cycle of the scheduling service and to further identify a second group of workload tasks of a second type during a second scheduling cycle of the scheduling service; and in which the workload discovery engine is to iteratively cycle through all of the plurality of distinct workload types supported by the scheduler on per-workload task type basis.

According to another embodiment of the system 601, the compute resource discovery engine is to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which the scheduling service operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler.

According to another embodiment, the system 601 further includes: an external cloud interface to communicatively link the system with one or more third-party private and/or public computing clouds via a public Internet.

According to another embodiment, the system 601 further includes: a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud-based service provider to the plurality of distinct customer organizations; and in which the cloud-based service provider receives inputs from the plurality of distinct customer organizations to schedule workload tasks for execution the plurality of computing resources.

Figure 7A:
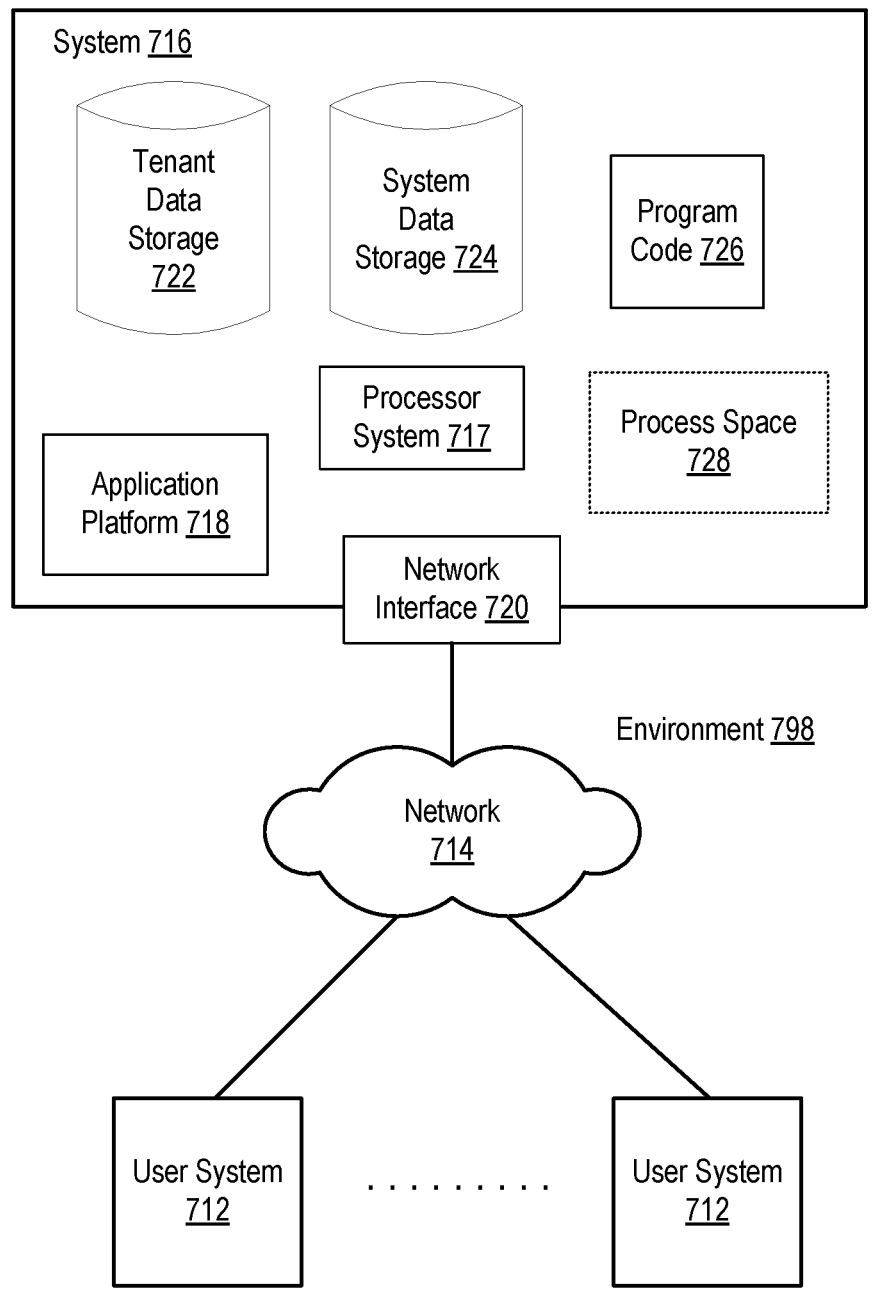
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
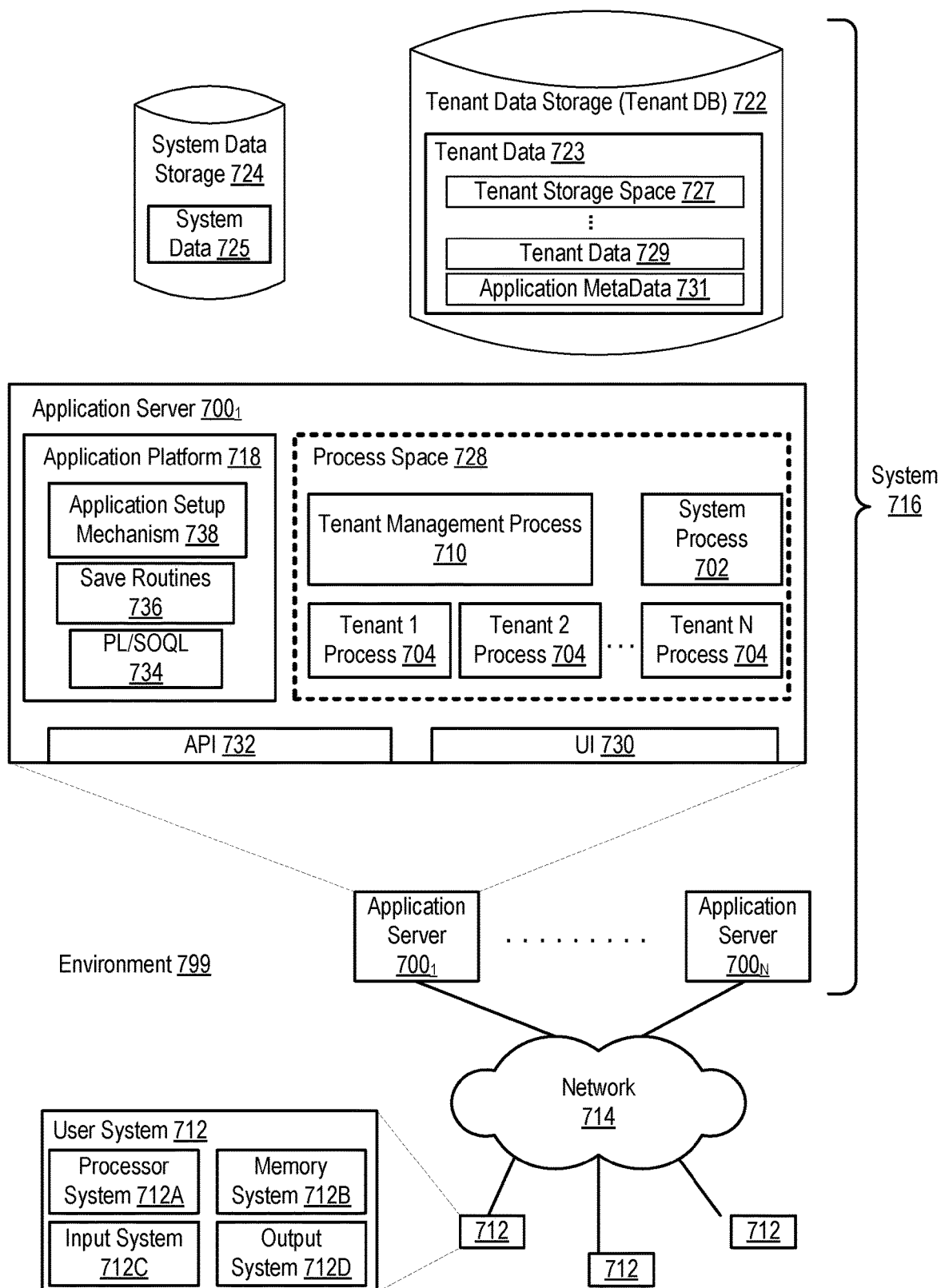
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
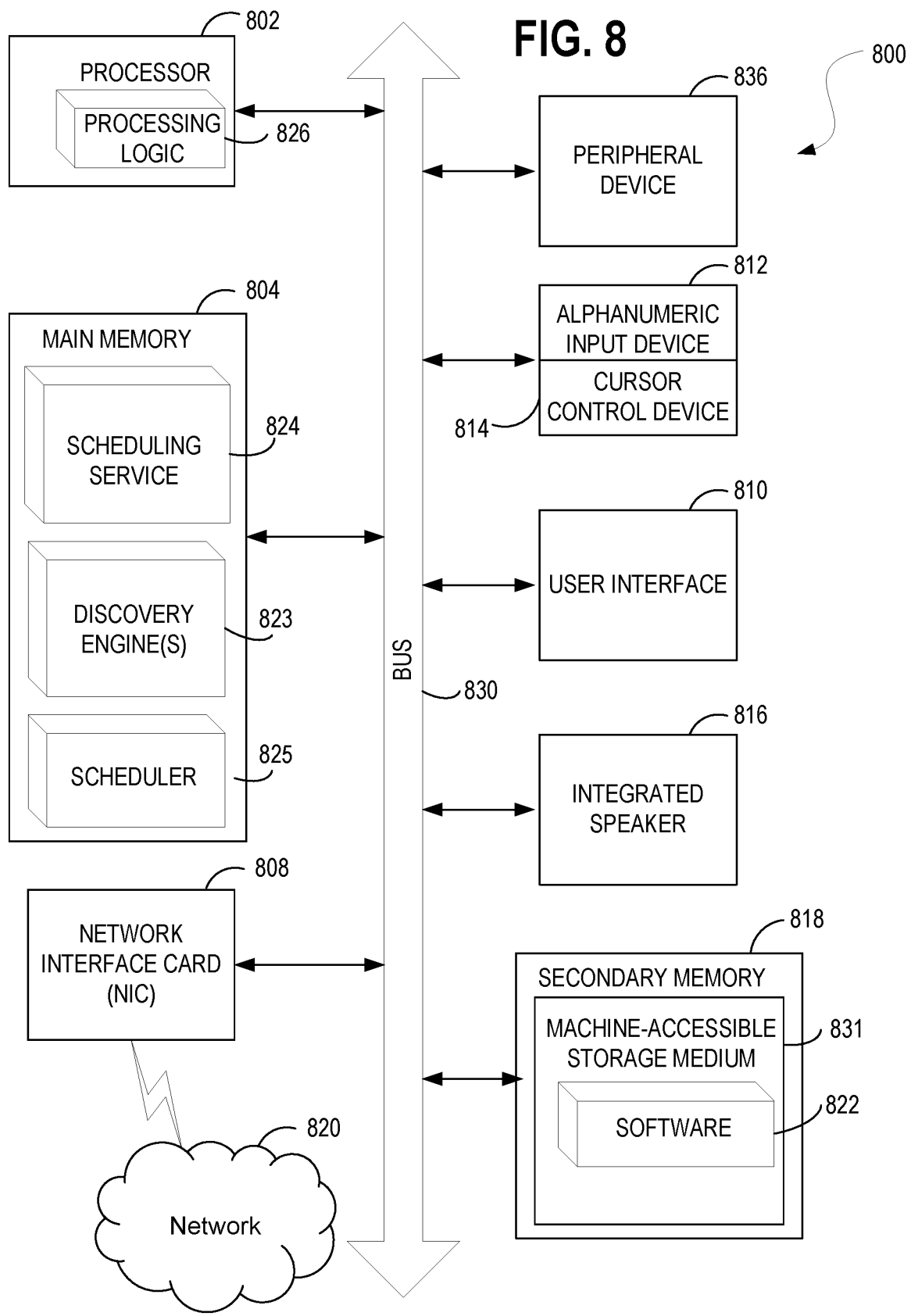
FIG. 8 illustrates a diagrammatic representation of a machine in the exemplary form of a computer system, in accordance with one embodiment.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a scheduling service 824 and discovery engines 823 and a scheduler 825 by which discover, identify, create, select, and plan workloads to be executed at available compute clouds or other computing architecture which provides on-demand services in accordance with described embodiments. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
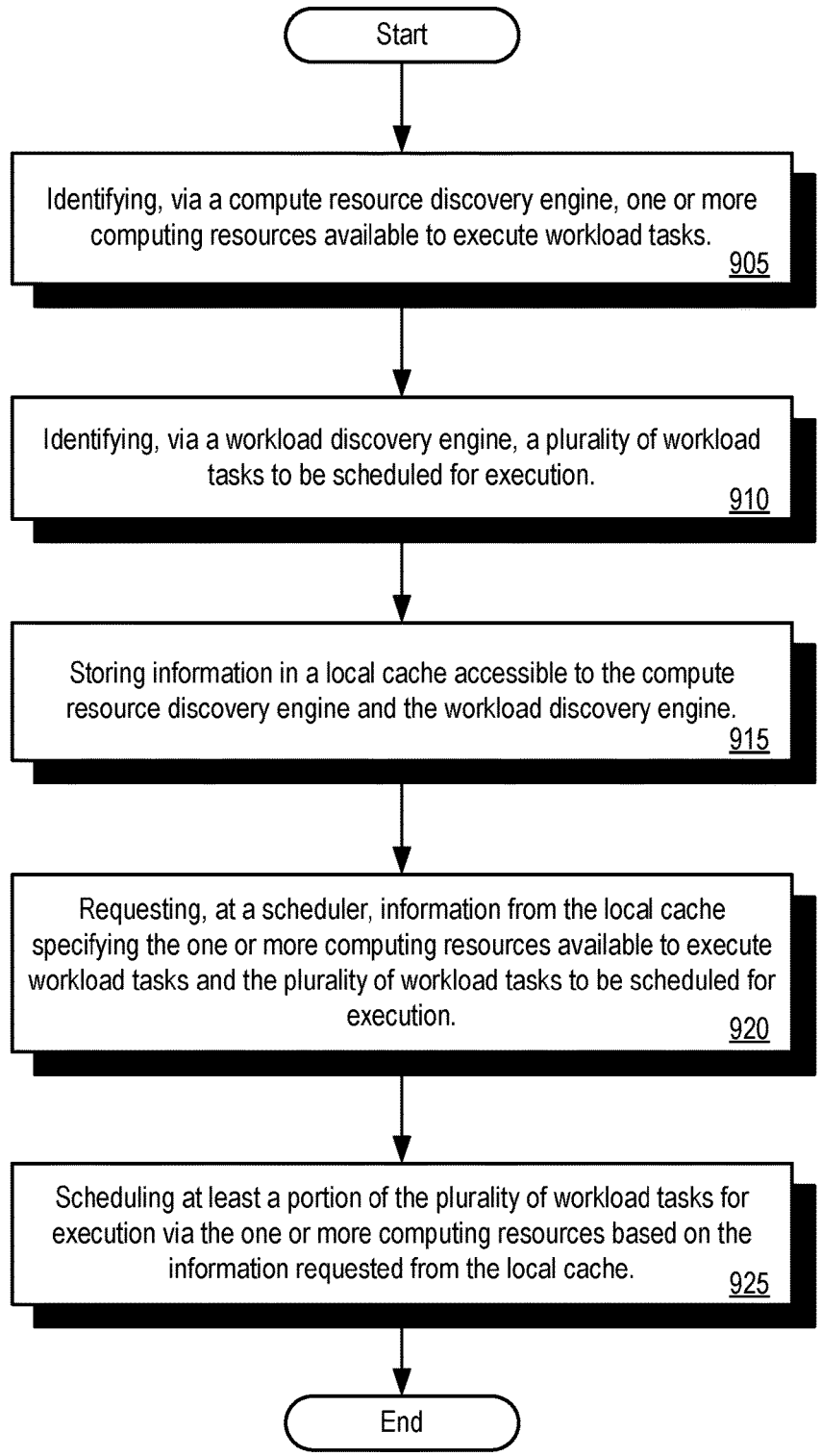
FIG. 9 depicts a flow diagram illustrating a method for implementing a stateless, deterministic scheduler and work discovery system with interruption recovery, in accordance with described embodiments.

FIG. 9 depicts a flow diagram illustrating a method 900 for implementing a stateless, deterministic scheduler and work discovery system with interruption recovery supported by a processor and a memory to execute such functionality. Method 900 may be performed by processing logic that may include hardware (e.g., circuitry, dedicated logic, programmable logic, microcode, etc.), software (e.g., instructions run on a processing device) to perform various operations such as identifying, storing, requesting, producing, creating, selecting, planning, scheduling, assigning, loading, executing, operating, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 111, the scheduling service 145, and its scheduler 191 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9, at block 905, processing logic identifies, via a compute resource discovery engine, one or more computing resources available to execute workload tasks.

At block 910, processing logic identifies, via a workload discovery engine, a plurality of workload tasks to be scheduled for execution.

At block 915, processing logic stores information in a local cache accessible to the compute resource discovery engine and the workload discovery engine.

At block 920, processing logic requests, at a scheduler, information from the local cache specifying the one or more computing resources available to execute workload tasks and the plurality of workload tasks to be scheduled for execution.

At block 925, processing logic schedules at least a portion of the plurality of workload tasks for execution via the one or more computing resources based on the information requested from the local cache.

In accordance with another embodiment of method 900, scheduling the workload tasks for execution via the one or more computing resources based on the information requested includes: producing a list of the workload tasks to be executed based on the information requested from the local cache; computing available capacity to execute workload tasks at each of the one or more computing resources based on the information requested from the local cache; selecting the portion of the plurality of workload tasks for execution via the one or more computing resources based on the information requested; and planning execution of the selected workload tasks by scheduling the selected portion of the plurality of workload tasks with the one or more computing resources based on the computed available capacity to execute workload tasks at each of the one or more computing resources.

In accordance with another embodiment of method 900, the scheduling further includes: initiating execution of the selected workload tasks at the one or more computing resources pursuant to the planned execution; and removing any selected and planned workload tasks from the list of the workload tasks to be executed.

In accordance with another embodiment of method 900, the scheduling further includes: initiating execution of the selected workload tasks at the one or more computing resources pursuant to the planned execution; and in which the workload discovery engine further performs operations including (i) determining the selected and planned workload tasks are executing at the one or more computing resources, and (ii) updating the local cache to indicate the selected and planned workload tasks are executing at the one or more computing resources; and in which the producing of the list of the workload tasks to be executed includes producing an updated list of the workload tasks during a subsequent processing cycle of the scheduler based on the updated information in the local cache including the indication that the selected and planned workload tasks are executing at the one or more computing resources; and in which the updated list does not include the selected and planned workload tasks indicated by the local cache as executing at the one or more computing resources.

In accordance with another embodiment of method 900, identifying the one or more computing resources available to execute workload tasks includes: re-discovering, via the compute resource discovery engine, a previously known computing resource having one or more workload tasks assigned for execution by the scheduler; in which the re-discovered previously known computing resource was removed from the local cache by the compute resource discovery engine due to planned or unplanned inaccessibility to the scheduler; updating the local cache to list the re-discovered previously known computing resource as one of the computing resources available to execute workload tasks; querying, via the compute resource discovery engine, the re-discovered previously known computing resource to determine any workload tasks presently executing which were assigned to the discovered computing resource by the scheduler; querying, via the compute resource discovery engine, the re-discovered previously known computing resource to determine any completed workload tasks which were assigned to the discovered computing resource by the scheduler; and updating the local cache with results received responsive to the queries.

In accordance with a particular embodiment there is a non-transitory computer readable storage media having instructions stored thereon that, when executed by a processor of a system, the instructions cause the system to perform operations including: identifying, via a compute resource discovery engine, one or more computing resources available to execute workload tasks; identifying, via a workload discovery engine, a plurality of workload tasks to be scheduled for execution; storing information in a local cache accessible to the compute resource discovery engine and the workload discovery engine; requesting, at a scheduler, information from the local cache specifying the one or more computing resources available to execute workload tasks and the plurality of workload tasks to be scheduled for execution; and scheduling at least a portion of the plurality of workload tasks for execution via the one or more computing resources based on the information requested from the local cache.

Figure 10:
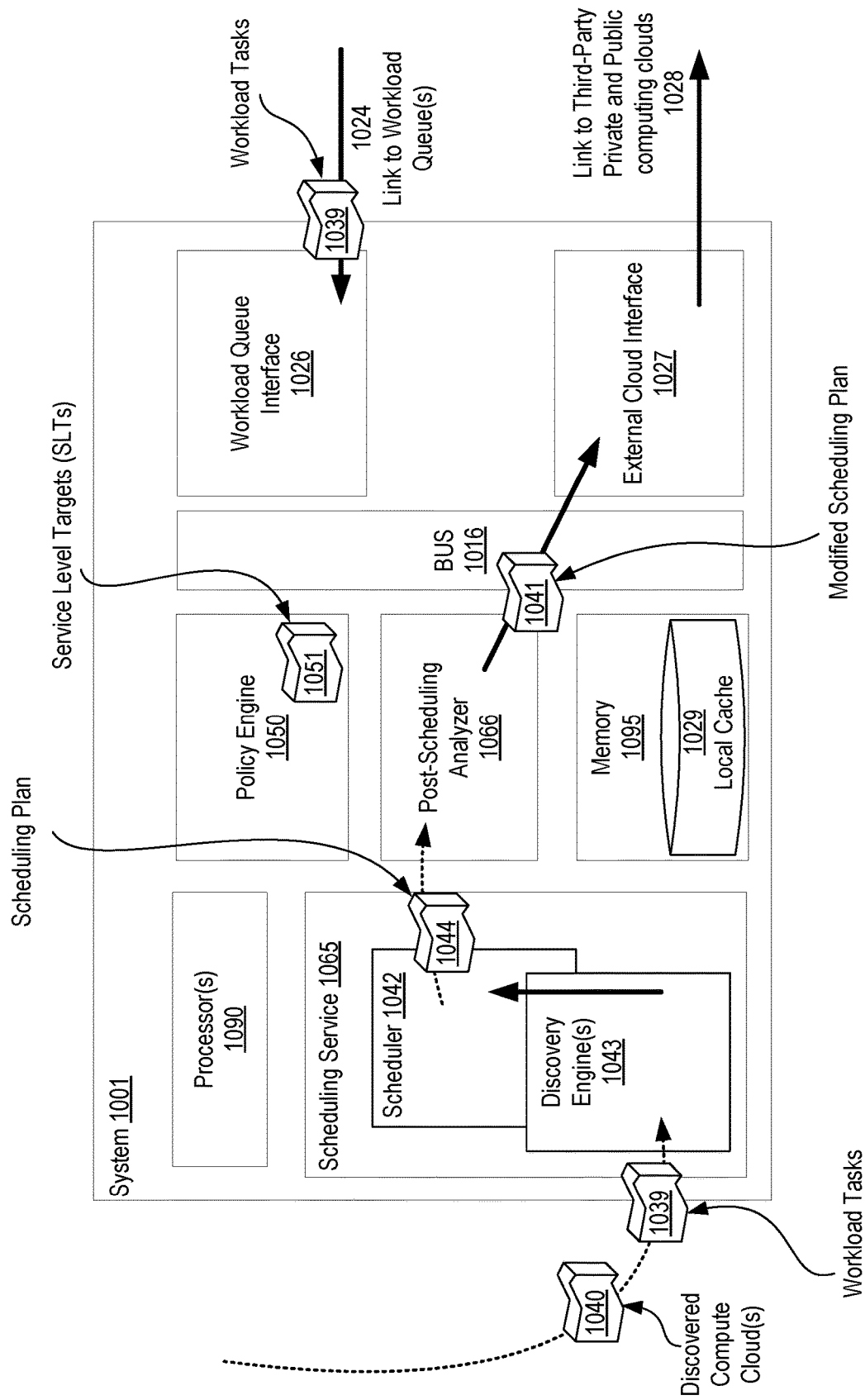
FIG. 10 shows a diagrammatic representation of a system within which embodiments may operate, be installed, integrated, or configured, in accordance with one embodiment.

FIG. 10 shows a diagrammatic representation of a system 1001 within which embodiments may operate, be installed, integrated, or configured.

According to the depicted embodiment, the system 1001, which may operate within a host organization, includes the processor 1090 and the memory 1095 to execute instructions at the system 1001. According to such an embodiment, the system 1001 is to implement a scheduling service 1065, in which the system includes: a local cache 1029 allocated within the memory 1095 of the system; a compute resource discovery engine 1043 to identify a plurality of computing resources 1028 available to execute workload tasks 1039, the computing resources residing within any one of private or public datacenters or third party computing clouds 1040 and a plurality of resource characteristics for each of the plurality of computing resources 1028 identified; in which the compute resource discovery engine 1043 is to fill the local cache 1029 with information representing each of the identified computing resources 1040 available and the plurality of resource characteristics identified for each of the plurality of computing resources 1040; a workload discovery engine 1043 to identify pending workload tasks 1039 to be scheduled for execution from one or more workload queues 1024 and to update the local cache 1029 with the identified workload tasks 1039; a policy engine 1050 to identify a Service Level Target (SLT) 1051 for each of the workload tasks identified and to update the local cache 1029 with the SLT for each workload task identified; and a scheduler 1042 to schedule each workload task for execution via one of the computing resources available based on which of the computing resources are estimated to meet the SLT 1051.

According to another embodiment of the system 1001, a user interface operates at a user client device remote from the system and communicatively interfaces with the system via a public Internet and the external cloud interface 1027 provides a communications link to third party private and public computing clouds 1028 on behalf of the scheduling service 1065.

Such a system may reside within a host organization which operates as a cloud-based service provider to the user client device; in which the cloud-based service receives inputs from the client device at the user interface to configure use of the scheduling service 1065 and identify workload tasks to be performed on behalf of the user device or on behalf of a customer organization, developer, business customer, or another user.

According to a particular embodiment workload tasks 1039 are retrieved by the system 1001 from one or more workload queues via a workload queue interface 1026 and a link to the workload queues 1024.

Bus 1016 interfaces the various components of the system 1001 amongst each other, with any other peripheral(s) of the system 1001, and with external components such as external network elements, other machines, client devices, cloud computing services, etc. Communications may further include communicating with external devices via a network interface over a LAN, WAN, or the public Internet.

According to another embodiment of the system 1001, the plurality of resource characteristics for each of the plurality of computing resources identified include one or more of CPU type, quantity of CPU cores, memory type, memory quantity, licenses, operating system type, virtual machine (VM) execution policy, pricing data, minimum workload allocation, maximum workload allocation, electrical power data, and carbon footprint data.

According to another embodiment of the system 1001, each of the plurality of computing resources available to execute workload tasks implements a local computing resource interface at the respective computing resource, remote from the system; and in which the compute resource discovery engine to identify the plurality of resource characteristics for each of the plurality of computing resources identified includes the compute resource discovery engine to query the local computing resource interface at each of the plurality of computing resources identified.

According to another embodiment of the system 1001, the workload discovery engine is to retrieve the pending workload tasks from a continuous integration cloud.

According to another embodiment of the system 1001, the workload discovery engine retrieves one or more of: software auto builds for test or validation; codelines for test or validation; customer submitted code for test or validation; software release branches for test or validation; patch validation; and release branch for test or validation against specified software variants, operating system variants, or computing hardware variants.

According to another embodiment of the system 1001, the workload discovery engine is to: fill the local cache with the identified pending workload tasks; and associate each pending workload task within the local cache with a priority marker, a QoS indicator, and/or the SLT based on the workload queue from which the task was retrieved.

According to another embodiment of the system 1001, the workload discovery engine is to further identify a plurality of associated workload task requirements for each of the pending workload tasks; and in which the scheduler is to schedule the pending workload tasks based further on the associated workload task requirements and which of the plurality of computing resources available to execute workload tasks satisfies the associated workload task requirements and is estimated to meet the Service Level Target (SLT) for workload task.

According to another embodiment of the system 1001, the policy engine is to query a database system to retrieve the SLT for the workload task based at least in part on the workload task type.

According to another embodiment of the system 1001, multiple SLTs exist for each workload task type; and in which the SLT is identified by the policy engine based further on a customer identifier or an organizational identifier or a service tier associated with each respective workload task.

According to another embodiment of the system 1001, the SLT identified for each of the workload tasks defines a Quality of Service (QoS) expectation for each workload task; in which the scheduler does not guarantee or commit to meeting the QoS expectation for any individual workload task; and in which scheduler will adjust one or more of re-try logic, priority, end-to-end execution time, preferred resource allocation range, and aging for each workload task increase a likelihood of the respective workload task meeting the defined QoS expectation.

According to another embodiment of the system 1001, the scheduler is to evaluate pricing data represented within the local cache by the plurality of resource characteristics identified for each of the plurality of computing resources; and in which the scheduler is to schedule each workload task for execution based on which one of a plurality of computing resources have a lowest financial cost and are estimated to meet an execution completion deadline for the respective workload task.

According to another embodiment of the system 1001, the scheduler is to evaluate a specified customer preference for executing workload tasks at a specified one of the plurality of computing resources as represented within the SLT for the respective workload task.

According to another embodiment of the system 1001, the scheduler is to generate a scheduling plan 1044 as output; and in which the system further includes a post-scheduling analyzer to receive the scheduling plan 1044 from the scheduler and to evaluate the scheduling plan 1044 prior to initiating the scheduling plan 1044.

According to another embodiment of the system 1001, the post-scheduling analyzer 1066 is to create a modified scheduling plan 1041 by adding at least one workload task not selected by the scheduler to the scheduling plan or by removing at least one workload task selected by the scheduler from the scheduling plan 1044; and in which the scheduling service is to initiate execution of the workload tasks at the computing resources in accordance with the modified scheduling plan 1041.

According to another embodiment of the system 1001, the post-scheduling analyzer 1066 is to check for any of the workload tasks which were not selected for execution by the scheduler having a higher priority than any of the workload tasks selected for execution; in which the post-scheduling analyzer is to remove one or more workload tasks selected for execution in the scheduling plan having a lower priority than the workload tasks which were not selected for execution and have the higher priority; and in which the post-scheduling analyzer is to add at least one of the workload tasks having the higher priority to the scheduling plan.

According to another embodiment of the system 1001, the post-scheduling analyzer is to check for any of the workload tasks which were not selected for execution by the scheduler having a higher priority than any of the workload tasks selected for execution; and in which the post-scheduling analyzer is to exceed a maximum SLT allocation for one of the computing resources by adding at least one of the workload tasks having the higher priority to the scheduling plan.

According to another embodiment of the system 1001, the post-scheduling analyzer is to check for an allocation load which exceeds a specified maximum SLT allocation for any one of the computing resources; and in which the post-scheduling analyzer is to modify where at least one each workload is scheduled for execution by specifying a different one of the computing resources to load balance execution of the workload tasks across the plurality of computing resources.

According to another embodiment, the system 1001 further includes: a simulator to estimate changes to computing infrastructure by writing simulated data into the local cache representing additional hardware and computing infrastructure availability via one of the computing resources and by further updating the local cache with simulated workload tasks queued for execution; and in which the scheduler is to retrieve the simulated data from the local cache for processing by iterating through a scheduling cycle to plan, calculate, select, and plan the simulated workload tasks for execution against the simulated data representing the additional hardware and computer structure availability.

According to another embodiment of the system 1001, the compute resource discovery engine is to autonomously discover any one of: one or more third party compute clouds accessible to the scheduler; one or more private on-demand compute clouds accessible to the scheduler; one or more public on-demand compute clouds accessible to the scheduler; one or more computing pods within a local host organization within which the scheduling service operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler.

According to another embodiment, the system 1001 further includes: a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud based service provider to the plurality of distinct customer organizations; and in which the cloud based service provider receives inputs from the plurality of distinct customer organizations to schedule workload tasks for execution the plurality of computing resources.

Figure 11:
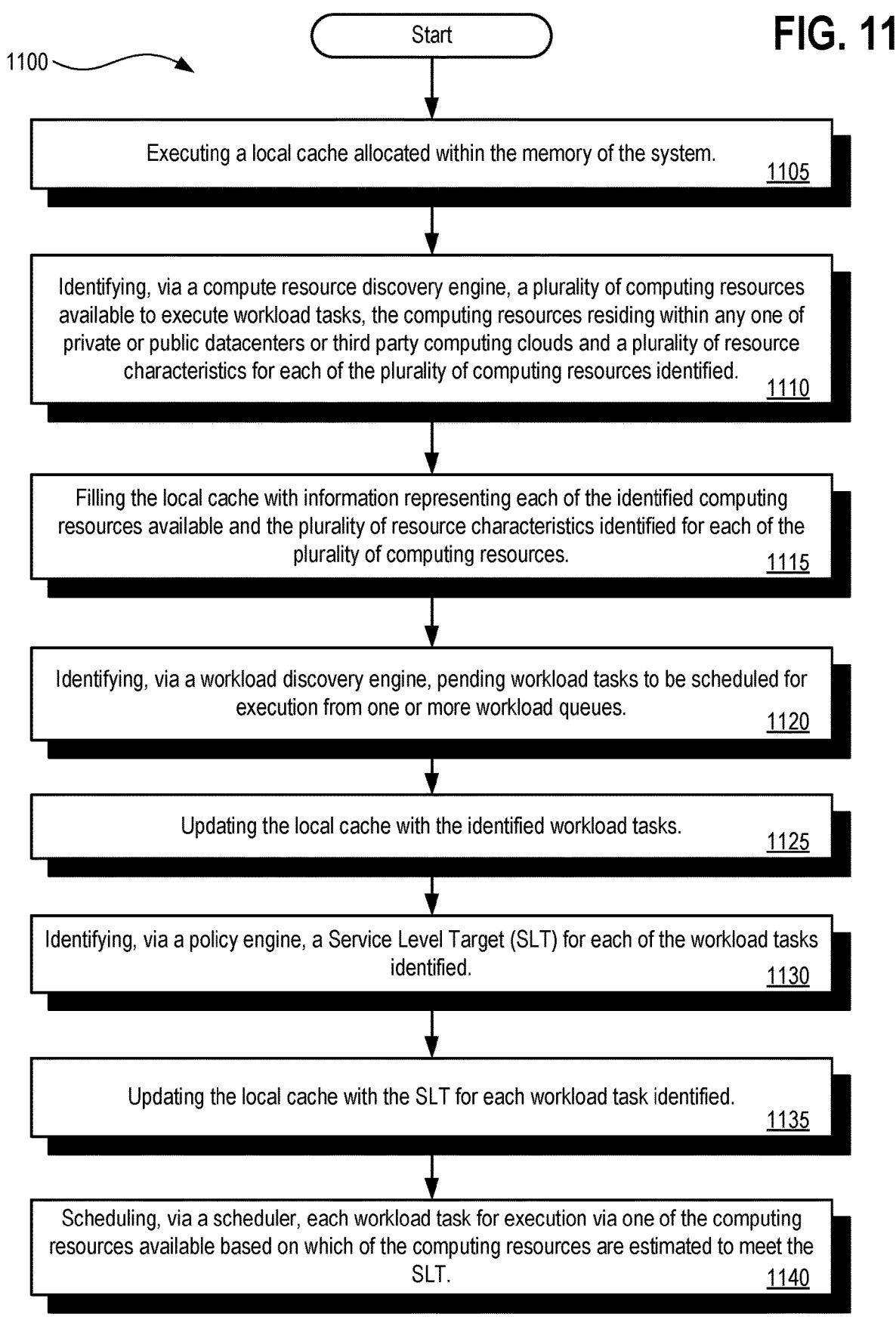
FIG. 11 depicts a flow diagram illustrating a method for implementing a scalable scheduler with heterogeneous resource allocation of large competing workloads types using Quality of Service (QoS) requirements, in accordance with described embodiments.

FIG. 11 depicts a flow diagram illustrating a method 1100 for implementing a scalable scheduler with heterogeneous resource allocation of large competing workloads types using Quality of Service (QoS) requirements supported by a processor and a memory to execute such functionality. Method 1100 may be performed by processing logic that may include hardware (e.g., circuitry, dedicated logic, programmable logic, microcode, etc.), software (e.g., instructions run on a processing device) to perform various operations such as executing, identifying, filling, updating, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 111, the scheduling service 145, and its scheduler 191 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1100 depicted at FIG. 11, at block 1105, processing logic executes a local cache allocated within the memory of the system.

At block 1110, processing logic identifies, via a compute resource discovery engine, a plurality of computing resources available to execute workload tasks, the computing resources residing within any one of private or public datacenters or third party computing clouds and a plurality of resource characteristics for each of the plurality of computing resources identified.

At block 1115, processing logic fills the local cache with information representing each of the identified computing resources available and the plurality of resource characteristics identified for each of the plurality of computing resources.

At block 1120, processing logic identifies, via a workload discovery engine, pending workload tasks to be scheduled for execution from one or more workload queues.

At block 1125, processing logic updates the local cache with the identified workload tasks.

At block 1130, processing logic identifies, via a policy engine, a Service Level Target (SLT) for each of the workload tasks identified.

At block 1135, processing logic updates the local cache with the SLT for each workload task identified.

At block 1140, processing logic schedules, via a scheduler, each workload task for execution via one of the computing resources available based on which of the computing resources are estimated to meet the SLT.

According to another embodiment of method 1100, the workload discovery engine to identify pending workload tasks to be scheduled for execution includes the workload discovery engine retrieving the pending workload tasks from a continuous integration cloud.

According to another embodiment of method 1100, identifying the pending workload tasks to be scheduled for execution from one or more workload queues includes: filling the local cache with the identified pending workload tasks; and associating each pending workload task within the local cache with a priority marker, a QoS indicator, and/or the SLT based on the workload queue from which the task was retrieved.

According to another embodiment of method 1100, identifying the SLT for each of the workload tasks includes querying a database system to retrieve the SLT for the workload task based at least in part on the workload task type; in which multiple SLTs exist for each workload task type; and in which the SLT is identified by the policy engine based further on a customer identifier or an organizational identifier or a service tier associated with each respective workload task.

According to another embodiment of method 1100, scheduling each workload task for execution via one of the computing resources includes the scheduler to generate a scheduling plan as output; in which the method further includes: sending the scheduling plan to a post-scheduling analyzer for evaluation; creating, via the post-scheduling analyzer, a modified scheduling plan by adding at least one workload task not selected by the scheduler to the scheduling plan or by removing at least one workload task selected by the scheduler from the scheduling plan; and initiating execution of the workload tasks at the computing resources in accordance with the modified scheduling plan.

According to a particular embodiment there is a non-transitory computer readable storage media having instructions stored thereon that, when executed by a processor of a system, the instructions cause the system to perform operations including: executing a local cache allocated within the memory of the system; identifying, via a compute resource discovery engine, a plurality of computing resources available to execute workload tasks, the computing resources residing within any one of private or public datacenters or third party computing clouds and a plurality of resource characteristics for each of the plurality of computing resources identified; filling the local cache with information representing each of the identified computing resources available and the plurality of resource characteristics identified for each of the plurality of computing resources; identifying, via a workload discovery engine, pending workload tasks to be scheduled for execution from one or more workload queues; updating the local cache with the identified workload tasks; identifying, via a policy engine, a Service Level Target (SLT) for each of the workload tasks identified; updating the local cache with the SLT for each workload task identified; and scheduling, via a scheduler, each workload task for execution via one of the computing resources available based on which of the computing resources are estimated to meet the SLT.

Figure 12:
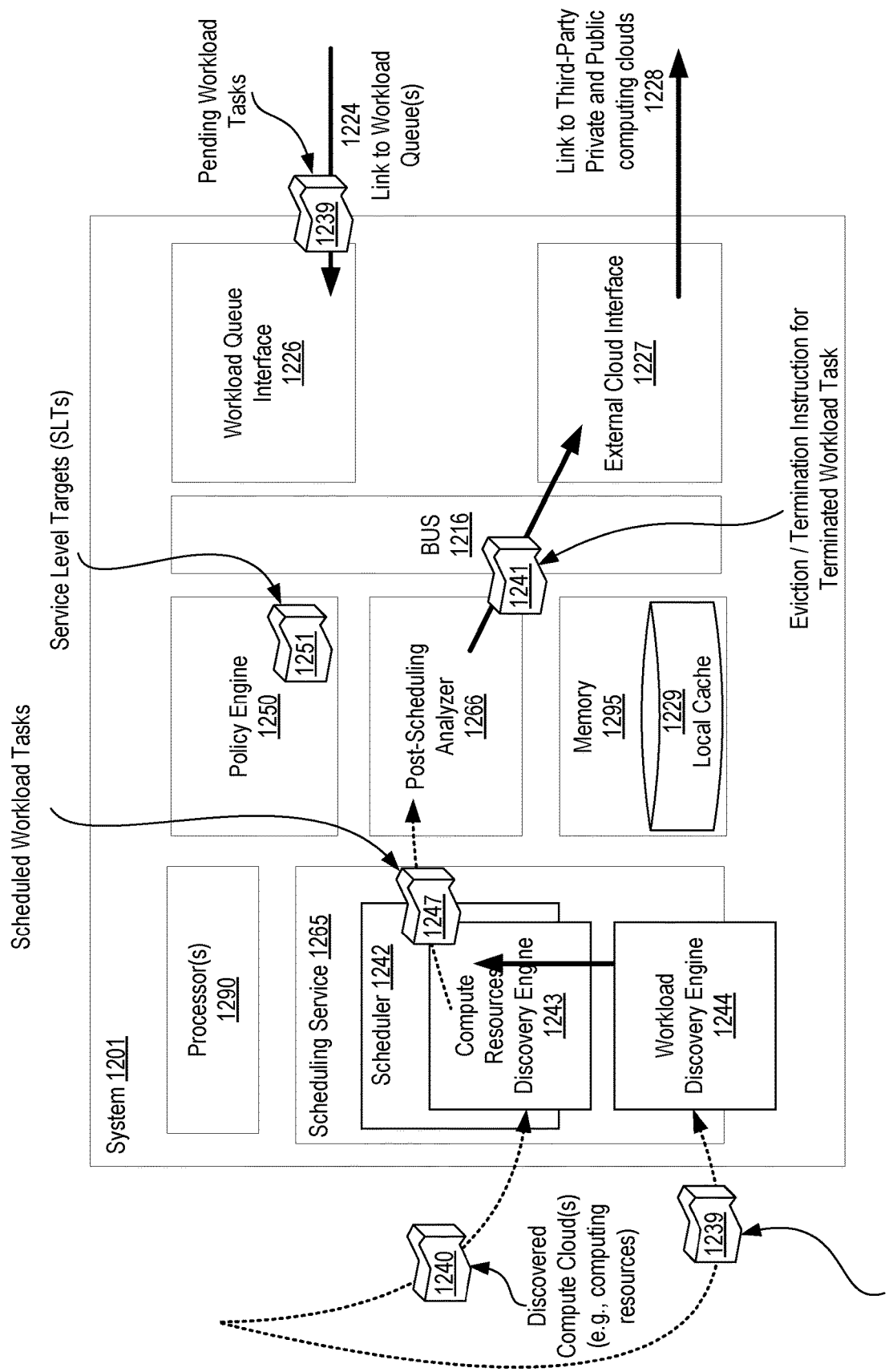
FIG. 12 shows a diagrammatic representation of a system within which embodiments may operate, be installed, integrated, or configured.

FIG. 12 shows a diagrammatic representation of a system 1201 within which embodiments may operate, be installed, integrated, or configured.

According to the depicted embodiment, the system 1201, which may operate within a host organization, includes the processor 1290 and the memory 1295 to execute instructions at the system 1201. According to such an embodiment, the system 1201 is to implement a scheduling service 1265, in which the system includes: a compute resource discovery engine 1243 to identify a plurality of computing resources 1240 currently executing scheduled workload tasks 1247; a workload discovery engine 1244 to identify one or more pending workload tasks 1239 to be scheduled for execution; in which each of the computing resources 1240 lack current available capacity to execute additional scheduled workload tasks 1247; a policy engine 1250 to define a Service Level Target (SLT) 1251 for each of the scheduled workload tasks 1247 currently executing via the plurality of computing resources 1240 and for each of the one or more pending workload tasks 1239 to be scheduled for execution; an analysis engine (e.g., the post-scheduling analyzer) 1266 to further terminate (e.g., via the eviction or termination instruction 1241) one of the scheduled workload tasks 1247 currently executing via the plurality of computing resources 1240 based on the defined SLTs 1251 for the respective workload tasks 1247; and a scheduler 1242 to schedule one of the pending workload tasks 1239 into capacity within the plurality of computing resources 1240 freed up by the terminated workload task 1241.

According to another embodiment of the system 1201, a user interface operates at a user client device remote from the system and communicatively interfaces with the system via a public Internet. According to another embodiment, the external cloud interface 1227 provides a communications link to third party private and public computing clouds 1228 on behalf of the scheduling service 1265.

Such a system may reside within a host organization which operates as a cloud-based service provider to the user client device; in which the cloud-based service receives inputs from the client device at the user interface to configure use of the scheduling service 1265 and identify workload tasks to be performed on behalf of the user device or on behalf of a customer organization, developer, business customer, or another user.

According to a particular embodiment pending workload tasks 1239 are retrieved by the system 1201 from one or more workload queues via a workload queue interface 1226 and a link to the workload queues 1224.

Bus 1216 interfaces the various components of the system 1201 amongst each other, with any other peripheral(s) of the system 1201, and with external components such as external network elements, other machines, client devices, cloud computing services, etc. Communications may further include communicating with external devices via a network interface over a LAN, WAN, or the public Internet.

According to another embodiment of the system 1201, the analysis engine 1266 is to further: identify a scheduled workload task 1247 currently executing via the plurality of computing resources 1240 having a lower priority than one of the pending workload tasks to be scheduled for execution based on the defined SLTs 1251 for the respective workload tasks; and further in which the analysis engine 1266 is to terminate the lower priority workload task.

According to another embodiment of the system 1201, the analysis engine is to further: identify a pending workload task having a higher priority than the scheduled workload task currently executing via the plurality of computing resources; in which the identified workload task having the higher priority includes a high priority task as defined by the SLTs; in which the scheduled workload task currently executing via the plurality of computing resources includes a low priority task as defined by the SLTs; and in which the scheduler is to schedule the high priority task for execution into the capacity within the plurality of computing resources freed up by the termination of the low priority task.

According to another embodiment of the system 1201, the pending workload task scheduled into the capacity within the plurality of computing resources freed up by the terminated workload task includes an urgent workload task based on inability for the pending workload task to complete execution within a time designated by its SLT; and in which the terminated workload task includes a non-urgent workload task based on the ability to re-schedule the terminated workload task at a later time and have the terminated workload task complete execution within the time designated by its SLT.

According to another embodiment, the system 1201 further includes: a local cache 1229 allocated within the memory of the system; and in which the scheduler to schedule one of the pending workload tasks into capacity within the plurality of computing resources freed up by the terminated workload task includes the scheduling service executing at least the following operations: producing a list of the workload tasks to be executed based on information requested from the local cache; computing available capacity to execute workload tasks at each of the plurality of computing resources based on the information requested from the local cache, in which the available capacity includes the capacity within the plurality of computing resources freed up by the terminated workload task; selecting a portion of the produced workload tasks for execution via the plurality of computing resources based on the information requested from the local cache, the portion of the produced workload tasks including at least one of the pending workload tasks having a higher priority than the terminated workload task as defined by the SLTs; and planning execution of the selected workload tasks; and initiating execution of the selected workload tasks at the plurality of computing resources pursuant to the planned execution including initiating execution of the one pending workload tasks having the higher priority than the terminated workload task within the capacity of the plurality of computing resources freed up by the terminated workload task.

According to another embodiment, the system 1201 further includes: a local cache allocated within the memory of the system; and in which the one or more pending workload tasks to be scheduled for execution are cached within the local cache by the workload discovery engine; in which the currently executing scheduled workload tasks are cached within the local cache by the compute resource discovery engine; and in which the policy engine is to associate the defined SLT for every pending workload tasks within the local cache and associate the defined SLT for every currently executing scheduled workload tasks within the local cache.

According to another embodiment of the system 1201, the analysis engine is to terminate a scheduled workload task currently executing having a lower priority as defined by the associated SLT within the local cache in comparison to a pending workload task having a higher priority as defined by the associated SLT within the local cache.

According to another embodiment of the system 1201, the scheduler iteratively performs operations to (i) produce a list of the workload tasks to be executed, (ii) computing available capacity to execute workload tasks on the produced list, (iii) select workload tasks from the produced list for execution based on available capacity within the plurality of computing resources, and (iv) plan execution of the selected workload tasks; in which the a first iteration of the scheduler produced, computed, selected, and planned the terminated workload task; in which the analysis engine operates during a post-scheduling operation to terminate the scheduled workload task; and in which a second or subsequent iteration of the scheduler produces, computes, selects, and plans execution of the pending workload tasks into the capacity within the plurality of computing resources freed up by the terminated workload task scheduled by the first iteration of the scheduler.

According to another embodiment, the system 1201 further includes: a local cache allocated within the memory of the system; and in which the workload discovery engine is to identify a pending high priority workload tasks to be scheduled from the local cache; and in which a post-scheduling operation analyzes pending workloads within the local cache to identify a high priority workload task to be scheduled into capacity within the plurality of computing resources freed up by the terminated workload task.

According to another embodiment of the system 1201, the analysis engine is to evict the terminated workload task from the capacity of one of the plurality of computing resources used for executing scheduled tasks and further includes the scheduler to schedule a selected pending workload task into the capacity freed up from the evicted and terminated workload task.

According to another embodiment of the system 1201, the analysis engine is to further terminate multiple scheduled workload tasks currently executing via the plurality of computing resources based on the defined SLTs for the respective workload tasks to free up sufficient capacity for a single pending workload tasks requiring a larger capacity than each of the multiple scheduled workload tasks terminated from execution at the plurality of computing resources; and in which the scheduler is to schedule the single pending workload tasks requiring the larger capacity into the capacity freed up from terminating the multiple scheduled workload tasks.

According to another embodiment of the system 1201, the system further includes an asynchronous local cache; in which the compute resource discovery engine and the workload discovery engine each update the information within the asynchronous local cache independent of the scheduler; and in which the scheduler requests information from the asynchronous local cache independent of the compute resource discovery engine and the workload discovery engine to determine which scheduled workload tasks currently executing via the plurality of computing resources is to be terminated based on the defined SLTs for the respective workload tasks and in which the scheduler further requests information from the asynchronous local cache independent of the compute resource discovery engine and the workload discovery engine to determine which pending workload task is to be scheduled into the capacity within the plurality of computing resources freed up by the terminated workload task.

According to another embodiment of the system 1201, the scheduler is to receive as input a list of all workload tasks to be executed based on information stored within a local cache; and in which the scheduler is to further select one pending workload task to be scheduled into the capacity within the plurality of computing resources freed up by the terminated workload task based one or more of: a priority associated with each of the workload tasks as specified via the list; a Quality of Service (QoS) designation for each of the workload tasks as specified via the list; and the SLT associated with each of the workload tasks as specified via the list.

According to another embodiment of the system 1201, the compute resource discovery engine to identify one or more computing resources available to execute workload tasks includes: the compute resource discovery engine to autonomously discover any one of: one or more third-party compute clouds accessible to the scheduler; one or more private on-demand compute clouds accessible to the scheduler; one or more public on-demand compute clouds accessible to the scheduler; one or more computing pods within a local host organization within which the scheduling service operates when the one or more computing pods are accessible to the scheduler; one or more remote computing pods within a remote host organization separate from the local host organization within which the scheduling service operates when the one or more remote computing pods are accessible to the scheduling service through the remote host organization; an OpenStack computing cloud accessible to the scheduler; a VMWare computing cloud accessible to the scheduler; an Amazon Web Services (AWS) public computing cloud accessible to the scheduler; a Microsoft Azure public computing cloud accessible to the scheduler; an AWS Direct Connect privately leased computing space accessible to the scheduler; and an Azure ExpressRoute privately leased computing space accessible to the scheduler.

According to another embodiment, the system 1201 further includes: an external cloud interface to communicatively link the system with one or more third-party private and/or public computing clouds via a public Internet.

According to another embodiment of the system 1201, the system includes a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud-based service provider to the plurality of distinct customer organizations; and in which the cloud-based service provider receives inputs from the plurality of distinct customer organizations to schedule workload tasks for execution the plurality of computing resources.

Figure 13:
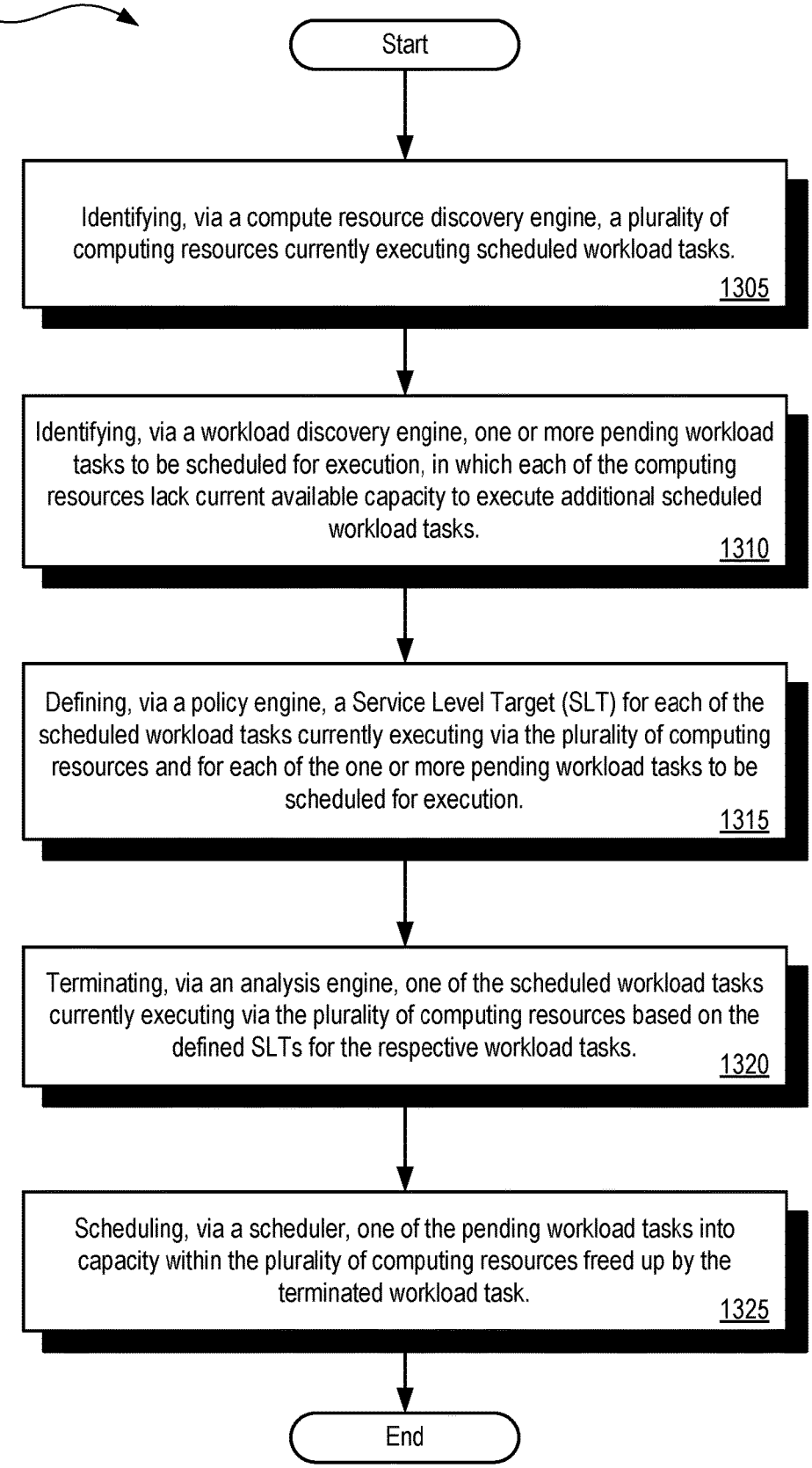
FIG. 13 depicts a flow diagram illustrating a method for implementing a scheduler with preemptive termination of existing workloads to free resources for high priority items in accordance with described embodiments.

FIG. 13 depicts a flow diagram illustrating a method 1300 for implementing a scheduler with preemptive termination of existing workloads to free resources for high priority items supported by a processor and a memory to execute such functionality. Method 1300 may be performed by processing logic that may include hardware (e.g., circuitry, dedicated logic, programmable logic, microcode, etc.), software (e.g., instructions run on a processing device) to perform various operations such as executing, identifying, defining, terminating, evicting, scheduling, producing, creating, selecting, planning, assigning, receiving, generating, maintaining, returning, presenting, interfacing, communicating, transmitting, querying, processing, providing, determining, triggering, displaying, updating, sending, etc., in pursuance of the systems and methods as described herein. For example, the hosted computing environment 131, the scheduling service 145, and its scheduler 125 and discovery engine(s) 192 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1300 depicted at FIG. 13, at block 1305, processing logic identifies, via a compute resource discovery engine, a plurality of computing resources currently executing scheduled workload tasks.

At block 1310, processing logic identifies, via a workload discovery engine, one or more pending workload tasks to be scheduled for execution, in which each of the computing resources lack current available capacity to execute additional scheduled workload tasks.

At block 1315, processing logic defines, via a policy engine, a Service Level Target (SLT) for each of the scheduled workload tasks currently executing via the plurality of computing resources and for each of the one or more pending workload tasks to be scheduled for execution.

At block 1320, processing logic terminates, via an analysis engine, one of the scheduled workload tasks currently executing via the plurality of computing resources based on the defined SLTs for the respective workload tasks.

At block 1325, processing logic schedules, via a scheduler, one of the pending workload tasks into capacity within the plurality of computing resources freed up by the terminated workload task.

According to another embodiment, the method 1300 further includes: identifying a scheduled workload task currently executing via the plurality of computing resources having a lower priority than one of the pending workload tasks to be scheduled for execution based on the defined SLTs for the respective workload tasks; and terminating one of the scheduled workload tasks currently executing via the plurality of computing resources includes the analysis engine to terminate the lower priority workload task.

According to another embodiment, the method 1300 further includes: identifying a pending workload task having a higher priority than the scheduled workload task currently executing via the plurality of computing resources; in which the identified workload task having the higher priority includes a high priority task as defined by the SLTs; in which the scheduled workload task currently executing via the plurality of computing resources includes a low priority task as defined by the SLTs; and in which scheduling one of the pending workload tasks into capacity within the plurality of computing resources freed up by the terminated workload task includes scheduling one of the pending workload tasks into capacity within the plurality of computing resources freed up by the terminated workload task includes the scheduler to schedule the high priority task for execution into the capacity within the plurality of computing resources freed up by the termination of the low priority task.

According to another embodiment of method 1300, the pending workload task scheduled into the capacity within the plurality of computing resources freed up by the terminated workload task includes an urgent workload task based on inability for the pending workload task to complete execution within a time designated by its SLT; and in which the terminated workload task includes a non-urgent workload task based on the ability to re-schedule the terminated workload task at a later time and have the terminated workload task complete execution within the time designated by its SLT.

According to another embodiment, the method 1300 further includes: executing a local cache within the memory of the system; and in which scheduling one of the pending workload tasks into capacity within the plurality of computing resources freed up by the terminated workload task further includes: producing a list of the workload tasks to be executed based on information requested from the local cache; computing available capacity to execute workload tasks at each of the plurality of computing resources based on the information requested from the local cache, in which the available capacity includes the capacity within the plurality of computing resources freed up by the terminated workload task; selecting a portion of the produced workload tasks for execution via the plurality of computing resources based on the information requested from the local cache, the portion of the produced workload tasks including at least one of the pending workload tasks having a higher priority than the terminated workload task as defined by the SLTs; and planning execution of the selected workload tasks; and initiating execution of the selected workload tasks at the plurality of computing resources pursuant to the planned execution including initiating execution of the one pending workload tasks having the higher priority than the terminated workload task within the capacity of the plurality of computing resources freed up by the terminated workload task.

According to another embodiment there is a non-transitory computer readable storage media having instructions stored thereon that, when executed by a processor of a system, the instructions cause the system to perform operations including: identifying, via a compute resource discovery engine, a plurality of computing resources currently executing scheduled workload tasks; identifying, via a workload discovery engine, one or more pending workload tasks to be scheduled for execution; in which each of the computing resources lack current available capacity to execute additional scheduled workload tasks; defining, via a policy engine, a Service Level Target (SLT) for each of the scheduled workload tasks currently executing via the plurality of computing resources and for each of the one or more pending workload tasks to be scheduled for execution; terminating, via an analysis engine, one of the scheduled workload tasks currently executing via the plurality of computing resources based on the defined SLTs for the respective workload tasks; and scheduling, via a scheduler, one of the pending workload tasks into capacity within the plurality of computing resources freed up by the terminated workload task.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to implement a scheduling service, wherein the system comprises:
 a processor and a memory to execute instructions at the system;
 a local cache allocated within the memory of the system;

a compute resource discovery engine to identify a plurality of computing clouds having resources available to execute workload tasks including pricing data for a third party cloud computing service accessible to the scheduling service;

wherein the compute resource discovery engine is to fill the local cache with information representing each of the identified computing clouds having resources available and a plurality of resource characteristics for each of the plurality of computing clouds identified, including the pricing data;

a workload discovery engine to identify pending workload tasks to be scheduled for execution from one or more workload queues and to update the local cache with the identified workload tasks;

a policy engine to identify a Service Level Target (SLT) for each of the pending workload tasks identified and to update the local cache with the SLT identified for each pending workload task;

a scheduler to evaluate the pricing data represented within the local cache and to schedule each workload task for execution based on which one of a plurality of computing resources (i) have a lowest financial cost and (ii) are estimated to meet an execution completion deadline in compliance with the SLT identified for each respective workload task, according to the information available from the local cache;

wherein the scheduler is further to schedule each workload task for execution by increasing resource allocation across capacity rounds according to a starvation check, including scheduling one or more of the workload tasks at the third party cloud computing service based on the pricing data within the local cache, wherein the scheduler retrieves developer-expanded scheduling functions specifying policy requirements from the local cache; and wherein each capacity round is assigned a specific priority according to task priority.

2. The system of claim 1:

wherein the compute resource discovery engine implements a separate monitor for each one of the plurality of computing clouds having resources available, wherein each separate monitor is to continuously update the information at the local cache with updated information representing each of the identified computing clouds having resources available and the plurality of resource characteristics as the updated information becomes available to the monitors;

wherein the plurality of resource characteristics for each of the plurality of computing resources identified include one or more of CPU type, quantity of CPU cores, memory type, memory quantity, licenses, operating system type, virtual machine (VM) execution policy, the pricing data, minimum workload allocation, maximum workload allocation, electrical power data, and carbon footprint data.

3. The system of claim 1:

wherein each of the plurality of computing resources available to execute workload tasks implements a local computing resource interface at the respective computing resource, remote from the system; and wherein the compute resource discovery engine to identify the plurality of resource characteristics for each of the plurality of computing resources identified comprises the compute resource discovery engine to query the local computing resource interface at each of the plurality of computing resources identified.

4. The system of claim 1, wherein the workload discovery engine to identify pending workload tasks to be scheduled for execution comprises the workload discovery engine retrieving the pending workload tasks from a continuous integration cloud.

5. The system of claim 1, wherein the workload discovery engine to identify pending workload tasks to be scheduled for execution comprises the workload discovery engine retrieving one or more of:

software auto builds for test or validation;
codelines for test or validation;
customer submitted code for test or validation;
software release branches for test or validation;
patch validation; and
release branch for test or validation against specified software variants, operating system variants, or computing hardware variants.

6. The system of claim 1, wherein the workload discovery engine to identify pending workload tasks to be scheduled for execution from one or more workload queues comprises the workload discovery engine to:

fill the local cache with the identified pending workload tasks; and associate each pending workload task within the local cache with a priority marker, a QoS indicator, and/or the SLT based on the workload queue from which the task was retrieved.

7. The system of claim 1:

wherein the workload discovery engine to further identify a plurality of associated workload task requirements for each of the pending workload tasks; and wherein the scheduler is to schedule the pending workload tasks based further on the associated workload task requirements and which of the plurality of computing resources available to execute workload tasks satisfies the associated workload task requirements and is estimated to meet the Service Level Target (SLT) for workload task.

8. The system of claim 1:

wherein the policy engine to identify the SLT for each of the workload tasks comprises the policy engine to query a database system to retrieve the SLT for the workload task based at least in part on the workload task type;

wherein the scheduler is to retrieve a determined capacity available from the local cache defining the determined capacity available for a known list of all possible workload tasks for a given workload type;

wherein the scheduler is to further calculate an allocation route to complete execution of the workload tasks utilizing any of the computing clouds having resources available to execute the workload tasks based on the SLT and based further on the determined capacity available;

wherein multiple SLTs exist for each workload task type; and wherein the SLT is identified by the policy engine based further on a customer identifier or an organizational identifier or a service tier associated with each respective workload task.

9. The system of claim 1:

wherein the SLT identified for each of the workload tasks defines a Quality of Service (QoS) expectation for each workload task;

wherein the scheduler does not guarantee or commit to meeting the QoS expectation for any individual workload task; and wherein scheduler will adjust one or more of re-try logic, priority, end-to-end execution time, preferred resource allocation range, and aging for each workload task increase a likelihood of the respective workload task meeting the defined QoS expectation.

10. The system of claim 1:
wherein the scheduler to schedule each workload task for execution based on which of the computing resources are estimated to meet the SLT comprises the scheduler to evaluate pricing data represented within the local cache by the plurality of resource characteristics identified for each of the plurality of computing resources; and
wherein the scheduler is to schedule each workload task for execution based on which one of a plurality of computing resources have a lowest financial cost and are estimated to meet an execution completion deadline for the respective workload task.

11. The system of claim 1:
wherein the scheduler to schedule each workload task for execution based on which of the computing resources are estimated to meet the SLT comprises the scheduler to evaluate a specified customer preference for executing workload tasks at a specified one of the plurality of computing resources as represented within the SLT for the respective workload task.

12. The system of claim 1:
wherein the scheduler to schedule each workload task for execution via one of the computing resources comprises the scheduler to generate a scheduling plan as output; and
wherein the system further comprises a post-scheduling analyzer to receive the scheduling plan from the scheduler and to evaluate the scheduling plan prior to initiating the scheduling plan.

13. The system of claim 11:
wherein the post-scheduling analyzer is to create a modified scheduling plan by adding at least one workload task not selected by the scheduler to the scheduling plan or by removing at least one workload task selected by the scheduler from the scheduling plan; and
wherein the scheduling service is to initiate execution of the workload tasks at the computing resources in accordance with the modified scheduling plan.

14. The system of claim 11, wherein the post-scheduling analyzer to evaluate the scheduling plan comprises the post-scheduling analyzer to check for any of the workload tasks which were not selected for execution by the scheduler having a higher priority than any of the workload tasks selected for execution;
wherein the post-scheduling analyzer is to remove one or more workload tasks selected for execution in the scheduling plan having a lower priority than the workload tasks which were not selected for execution and have the higher priority; and
wherein the post-scheduling analyzer is to add at least one of the workload tasks having the higher priority to the scheduling plan.

15. The system of claim 11, wherein the post-scheduling analyzer to evaluate the scheduling plan comprises the post-scheduling analyzer to check for any of the workload tasks which were not selected for execution by the scheduler having a higher priority than any of the workload tasks selected for execution; and
wherein the post-scheduling analyzer is to exceed a maximum SLT allocation for one of the computing resources by adding at least one of the workload tasks having the higher priority to the scheduling plan.

16. The system of claim 11:
wherein the post-scheduling analyzer to evaluate the scheduling plan comprises the post-scheduling analyzer to check for an allocation load which exceeds a specified maximum SLT allocation for any one of the computing resources; and
wherein the post-scheduling analyzer is to modify where at least one each workload is scheduled for execution by specifying a different one of the computing resources to load balance execution of the workload tasks across the plurality of computing resources.

17. The system of claim 1, further comprising:
a simulator to estimate changes to computing infrastructure by writing simulated data into the local cache representing additional hardware and computing infrastructure availability via one of the computing resources and by further updating the local cache with simulated workload tasks queued for execution; and
wherein the scheduler is to retrieve the simulated data from the local cache for processing by iterating through a scheduling cycle to plan, calculate, select, and plan the simulated workload tasks for execution against the simulated data representing the additional hardware and computer structure availability.

18. The system of claim 1:
wherein the compute resource discovery engine to identify a plurality of computing resources available to execute workload tasks, comprises the compute resource discovery engine to autonomously discover any one of:
one or more third party compute clouds accessible to the scheduler;
one or more private on-demand compute clouds accessible to the scheduler;
one or more public on-demand compute clouds accessible to the scheduler;
one or more computing pods within a local host organization within which the scheduling service operates when the one or more computing pods are accessible to the scheduler;
one or more remote computing pods within a remote host organization separate from the local host organization within which the scheduling service operates when the one or more remote computing pods are accessible to the scheduling service through the remote host organization;
an OpenStack computing cloud accessible to the scheduler;
a VMWare computing cloud accessible to the scheduler;
an Amazon Web Services (AWS) public computing cloud accessible to the scheduler;
a Microsoft Azure public computing cloud accessible to the scheduler;
an AWS Direct Connect privately leased computing space accessible to the scheduler; and
an Azure ExpressRoute privately leased computing space accessible to the scheduler.

19. The system of claim 1, further comprising:
a multi-tenant database system having customer data stored therein for a plurality of distinct customer organizations;
wherein each customer organization is an entity selected from the group consisting of: a separate and distinct remote organization, an organizational group within the host organization, a business partner of the host organization, or a customer organization that subscribes to cloud computing services provided by the host organization;

wherein the system operates at a host organization as a cloud based service provider to the plurality of distinct customer organizations; and wherein the cloud based service provider receives inputs from the plurality of distinct customer organizations to schedule workload tasks for execution the plurality of computing resources.

20. A method performed by system having at least a processor and a memory therein, wherein the method comprises:

executing a local cache allocated within the memory of the system;

identifying, via a compute resource discovery engine, a plurality of computing clouds having resources available to execute workload tasks including pricing data for a third party cloud computing service accessible to the scheduling service;

filling the local cache with information representing each of the identified computing resources available and a plurality of resource characteristics for each of the plurality of computing resources identified, including the pricing data;

identifying, via a workload discovery engine, pending workload tasks to be scheduled for execution from one or more workload queues;

updating the local cache with the pending workload tasks identified;

identifying, via a policy engine, a Service Level Target (SLT) for each of the pending workload tasks identified;

updating the local cache with the SLT identified for each pending workload task identified; and evaluating the pricing data represented within the local cache and to schedule each workload task for execution based on which one of a plurality of computing resources (i) have a lowest financial cost and (ii) are estimated to meet an execution completion deadline in compliance with the SLT identified for each respective workload task, according to the information available from the local cache;

scheduling, via a scheduler, each workload task for execution by increasing resource allocation across capacity rounds according to a starvation check, including scheduling one or more of the workload tasks at the third party cloud computing service based on the pricing data within the local cache, wherein the scheduler retrieves developer-expanded scheduling functions specifying policy requirements from the local cache; and wherein each capacity round is assigned a specific priority according to task priority.

21. The method of claim 20,
wherein the compute resource discovery engine implements a separate monitor for each one of the plurality of computing clouds having resources available, wherein each separate monitor is to continuously update the information at the local cache with updated information representing each of the identified computing clouds having resources available and the plurality of resource characteristics as the updated information becomes available to the monitors;

wherein the plurality of resource characteristics for each of the plurality of computing resources identified include one or more of CPU type, quantity of CPU cores, memory type, memory quantity, licenses, operating system type, virtual machine (VM) execution policy, the pricing data, minimum workload allocation, maximum workload allocation, electrical power data, and carbon footprint data, wherein the compute resource discovery engine implements a separate monitor for each one of the plurality of computing clouds having resources available, wherein each separate monitor is to continuously update the information at the local cache with updated information representing each of the identified computing clouds having resources available and the plurality of resource characteristics as the updated information becomes available to the monitors; and wherein the plurality of resource characteristics for each of the plurality of computing resources identified include one or more of CPU type, quantity of CPU cores, memory type, memory quantity, licenses, operating system type, virtual machine (VM) execution policy, the pricing data, minimum workload allocation, maximum workload allocation, electrical power data, and carbon footprint data.

22. The method of claim 20, wherein the workload discovery engine to identify pending workload tasks to be scheduled for execution comprises the workload discovery engine retrieving the pending workload tasks from a continuous integration cloud.

23. The method of claim 20, wherein identifying the pending workload tasks to be scheduled for execution from one or more workload queues comprises:

filling the local cache with the identified pending workload tasks; and associating each pending workload task within the local cache with a priority marker, a QoS indicator, and/or the SLT based on the workload queue from which the task was retrieved.

24. The method of claim 20:
wherein identifying the SLT for each of the workload tasks comprises querying a database system to retrieve the SLT for the workload task based at least in part on the workload task type;

wherein multiple SLTs exist for each workload task type; and wherein the SLT is identified by the policy engine based further on a customer identifier or an organizational identifier or a service tier associated with each respective workload task.

25. The method of claim 20:
wherein scheduling each workload task for execution via one of the computing resources comprises the scheduler to generate a scheduling plan as output;

wherein the method further comprises:
sending the scheduling plan to a post-scheduling analyzer for evaluation;

creating, via the post-scheduling analyzer, a modified scheduling plan by adding at least one workload task not selected by the scheduler to the scheduling plan or by removing at least one workload task selected by the scheduler from the scheduling plan; and initiating execution of the workload tasks at the computing resources in accordance with the modified scheduling plan.

26. Non-transitory computer readable storage media having instructions stored thereon that, when executed by a processor of a system, the instructions cause the system to perform operations including:

executing a local cache allocated within the memory of the system;

identifying, via a compute resource discovery engine, a plurality of computing clouds having resources available to execute workload tasks including pricing data for a third party cloud computing service accessible to the scheduling service;

filling the local cache with information representing each of the identified computing resources available and a plurality of resource characteristics for each of the plurality of computing resources identified, including the pricing data;

identifying, via a workload discovery engine, pending workload tasks to be scheduled for execution from one or more workload queues;

updating the local cache with the pending workload tasks identified;

identifying, via a policy engine, a Service Level Target (SLT) for each of the pending workload tasks identified;

updating the local cache with the SLT identified for each pending workload task identified; and evaluating the pricing data represented within the local cache and to schedule each workload task for execution based on which one of a plurality of computing resources (i) have a lowest financial cost and (ii) are estimated to meet an execution completion deadline in compliance with the SLT identified for each respective workload task, according to the information available from the local cache;

scheduling, via a scheduler, each workload task for execution by increasing resource allocation across capacity rounds according to a starvation check, including scheduling one or more of the workload tasks at the third party cloud computing service based on the pricing data within the local cache, wherein the scheduler retrieves developer-expanded scheduling functions specifying policy requirements from the local cache; and wherein each capacity round is assigned a specific priority according to task priority.

27. The non-transitory computer readable storage media of claim 26:

wherein identifying the SLT for each of the workload tasks comprises querying a database system to retrieve the SLT for the workload task based at least in part on the workload task type;

wherein multiple SLTs exist for each workload task type; and wherein the SLT is identified by the policy engine based further on a customer identifier or an organizational identifier or a service tier associated with each respective workload task.

28. The non-transitory computer readable storage media of claim 26:

wherein scheduling each workload task for execution via one of the computing resources comprises the scheduler to generate a scheduling plan as output;

wherein the instructions, when executed, cause the system to perform operations further comprising:

sending the scheduling plan to a post-scheduling analyzer for evaluation;

creating, via the post-scheduling analyzer, a modified scheduling plan by adding at least one workload task not selected by the scheduler to the scheduling plan or by removing at least one workload task selected by the scheduler from the scheduling plan; and initiating execution of the workload tasks at the computing resources in accordance with the modified scheduling plan.

* * * * *